(12) United States Patent
Ezawa

(10) Patent No.: US 7,039,186 B2
(45) Date of Patent: May 2, 2006

(54) ENCRYPTION KEY GENERATION CIRCUIT

(75) Inventor: Masayuki Ezawa, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 741 days.

(21) Appl. No.: 09/984,924

(22) Filed: Oct. 31, 2001

(65) Prior Publication Data

US 2002/0051535 A1    May 2, 2002

(30) Foreign Application Priority Data

Oct. 31, 2000    (JP)    ............... 2000-334013

(51) Int. Cl.
*H04L 9/00*    (2006.01)
(52) U.S. Cl. ...................................... 380/44
(58) Field of Classification Search ................ 380/277
See application file for complete search history.

(56) References Cited

U.S. PATENT DOCUMENTS 6,314,186 B1 * 11/2001 Lee et al. ..................... 380/28

FOREIGN PATENT DOCUMENTS

| EP | 0 443 752 A2 A2 | 8/1991 |
|----|------|--------|
| JP | 11-45049 | 2/1999 |
| JP | 11-45049 A | 2/1999 |
| JP | 2000-39840 | 2/2000 |

OTHER PUBLICATIONS

Cyllnk Corporation, SAFER+, First Advanced Encryption Standard Candidate Conference,□□Aug. 20-22, 1998; Ventura, CA; slides 12 and 13□□.*
Cylink Corporation, SAFER+, First Advanced Encryption Standard Candidate Conference, Aug. 20-22, 1998, Ventura, CA.
Charles S. Williams, Comments on Cylink's AES Candidate Algorithm SAFER+, Apr. 14, 1999, pp. 1-7, XP-002226944.

* cited by examiner

*Primary Examiner*—Emmanuel L. Moise
*Assistant Examiner*—Nadia Khoshnoodi
(74) *Attorney, Agent, or Firm*—Birch, Stewart, Kolasch & Birch, LLP

(57) ABSTRACT

An encryption key generation circuit for generating at least one 128-bit round sub key used in at least one sub round for encryption of 128-bit plaintext, from an encryption key having 64×n bits ($2 \leq n \leq 4$; where n is an integer) includes a byte rotation circuit for performing byte rotation of rotating (8×n+1)-byte information by 1 byte; a 3-bit rotation circuit for performing 3-bit rotation of rotating bits in each byte of the (8×n+1) -byte information by 3 bits; and 16 adders for adding a 128-bit bias value to (8×n)-byte information from the byte lowest of the (8×n+1)-byte information processed with the byte rotation and the 3-bit rotation, so as to generate one of the at least one 128-bit round sub key in each sub round.

8 Claims, 24 Drawing Sheets

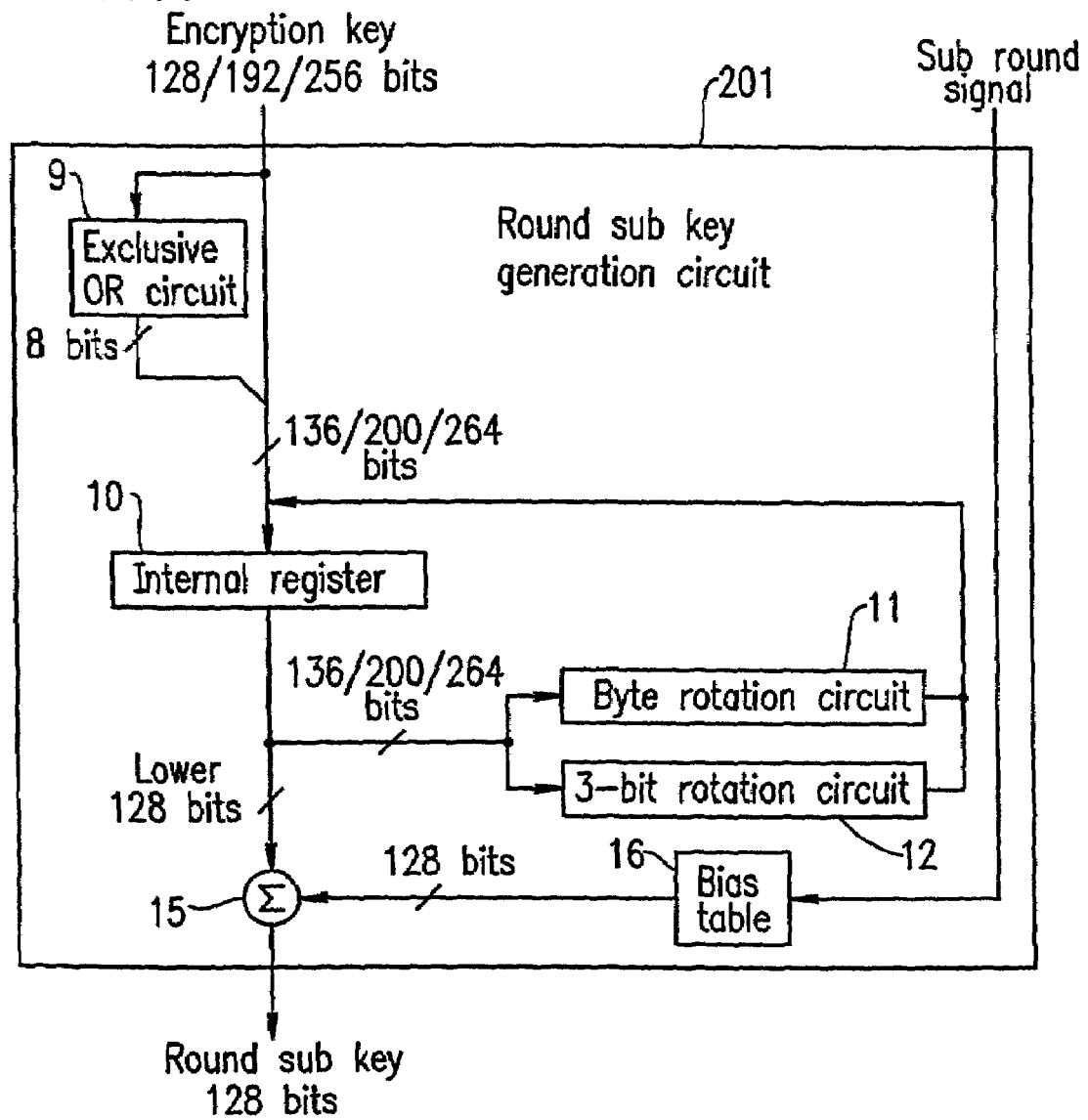

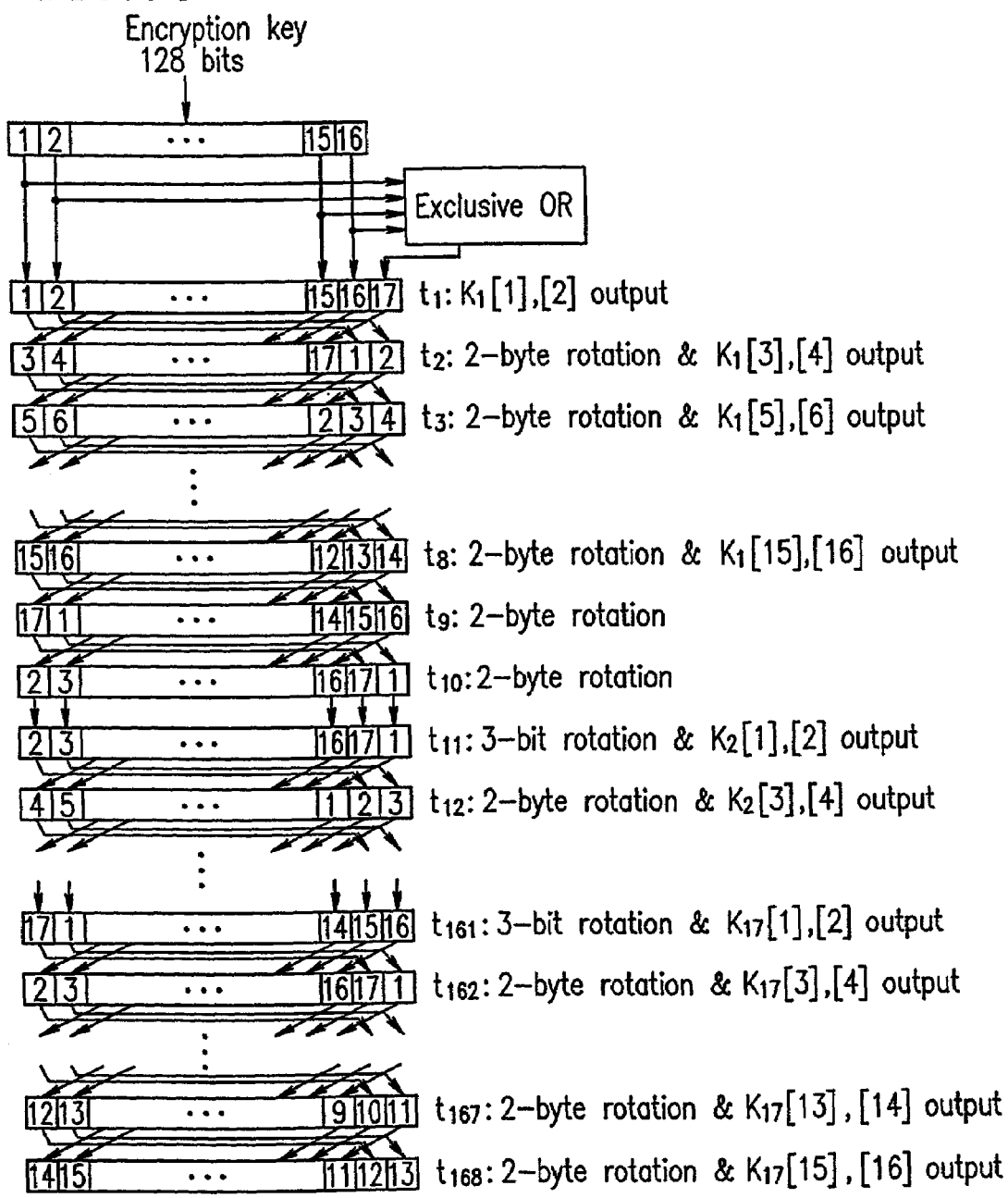

ENCRYPTION KEY GENERATION CIRCUIT

BACKGROUND OF THE INVENTION

1. Field of the Invention

The present invention relates to a circuit usable for encrypting information, and specifically to a small-scale encryption key generation circuit for generating a round sub key used in an encryption algorithm referred to as "SAFER+".

2. Description of the Related Art

An algorithm for encrypting information, known as "SAFER+" developed by Cylink Corp., has been made public. "SAFER+" is shown in FIG. 20 and is represented by reference numeral 1. The SAFER+ encryption algorithm 1 encrypts pre-encrypted 128-bit input data (plaintext) into a 128-bit encrypted text, using an encryption key having a bit length of 128, 192 or 256 bits.

The SAFER+ encryption algorithm 1 uses a round sub key generation circuit 2 for generating 17 round sub keys when the encryption key has 128 bits, 25 round sub keys when the encryption key has 192 bits, and 33 round sub keys when the encryption key has 256 bits; and an encryption circuit 3 for encrypting plaintext using the round sub key generated by the round sub key generation circuit 2.

In this algorithm, a calculation process is divided into stages referred to as "rounds". The number of rounds is 8 when the encryption key has 128 bits, 12 when the encryption key has 192 bits, and 16 when the encryption key has 256 bits. Each round is further divided into two sub rounds, and only the final round is divided into three sub rounds. Accordingly, the number of sub rounds is 17 when the encryption key has 128 bits, when the encryption key has 192 bits, and 33 when the encryption key has 256 bits. A 128-bit round sub key is generated for each sub round.

FIG. 21 illustrates an algorithm for generating 17 round sub keys in the case where the encryption key has 128 bits. FIG. 22 illustrates an algorithm for generating 25 round sub keys in the case where the encryption key has 192 bits. FIG. 23 illustrates an algorithm for generating 33 round sub keys in the case where the encryption key has 256 bits. Among these algorithms, the algorithm for the case where the encryption key has 128 bits will be described with reference to FIG. 21.

The algorithm shown in FIG. 21 is for generating 17 round sub keys $K_1$ through $K_{17}$ from a 128-bit encryption key. Square boxes numbered "1", "2", . . . "15" and "16" each represent 8 bits of the 128-bit input encryption key. Among the 128 bits (i.e., 16 bytes), the lowest byte is assigned to the box numbered "1", and the highest byte is assigned to the box numbered "16". The least significant bit among the 128 bits is the lowest bit of the lowest byte represented by the box numbered "1", and the most significant bit is the highest bit of the highest byte represented by the box numbered "16". As a first round sub key $K_1$, the 128-bit encryption key is output as it is.

In order to generate a round sub key $K_2$ for the second sub round, the 17th byte is produced as follows. The input 128-bit encryption key is divided into 16 bytes, and an exclusive OR (XOR) of information at the same bit positions in the 16 bytes is found. The resultant value is defined as representing the information for the respective bit position in the 17th byte.

Then, 3-bit rotation is performed in each of the 17 bytes. Namely, for example, 8 bits of {7, 6, 5, 4, 3, 2, 1, 0} are rotated leftward by 3 bits, thereby obtaining {4, 3, 2, 1, 0, 7, 6, 5}. As a round sub key $K_j$ for the jth sub round, information represented by the jth byte is first output as the lowest byte. Then, (j+1)th byte, (j+2)th byte, . . . , (j+15)th byte are output, to the total of 16 bytes. When (j+i) exceeds 17, the number of the byte obtained by subtracting 17 from (j+i) is output. In the case of, for example, the round sub key $K_{15}$, bytes {15, 16, 17, 1, 2, 3, 4, 5, 6, 7, 8, 9, 10, 11, 12, 13} are selected in this order and output sequentially. Then, a bias value $B_j$ is added to the information represented by the bytes output in this order. The bias value $B_j$ is a fixed value represented by 128 bits, which is determined by a sub round number j. The bias value $B_j$ and the selected value are added together so that it is not necessary to consider carry-over for each byte. Where the ith byte of the bias value $B_j$ is $B_j[i]$, the lowest byte of the round sub key $K_{15}$ is obtained by adding the information represented by the 15th byte of an internal register and $B_{15}[0]$. According to the addition for which carry-over need not be considered for each byte, when the addition result $\alpha \leq 255$, $\alpha$ is set as the addition result as it is; and when the addition result $\alpha > 255$, $(\alpha-256)$ is set as the addition result.

As described above, for round sub keys $K_2$ through $K_{17}$, 3-bit rotation, and output and addition of bias values from the jth byte to the (j+15)th byte are repeated, thereby generating the corresponding round sub keys.

As shown in FIGS. 22 and 23, a round sub key is generated from a 192-bit encryption key or a 256-bit encryption key in basically the same manner as the case of the 128-bit encryption key, except for the following differences. The number of bytes stored is larger. In addition, in the case of 128 bias, when the value of (j+1) exceeds 17, 17 is subtracted from (j+1). In the case of 192 bits, when the value of (j+1) exceeds 25, 25 is subtracted from (j+1). In the case of 256 bits, when the value of (j+1) exceeds 33, 33 is subtracted from (j+1).

Many other encryption algorithms have been proposed and made public in, for example, Japanese Laid-Open Publication No. 2000-39840. This publication does not include any specific examples of key generation. Japanese Laid-Open Publication No. 11-45049 discloses a key generation procedure, but the encryption algorithm described in this publication is different from SAFER+, which is used by the present invention.

The above-described algorithm for generating a round sub key has the following problems. When an encryption key is input, all the round sub keys are simultaneously calculated and output. Therefore, the scale of the circuit is inevitably large. This is easily understood because selectors are necessary for changing the bytes to be output for each round sub key, and because 16 times of (number of the round sub keys −1) adders are necessary; i.e., 256 adders are necessary when the encryption key has 128 bits, 384 adders are necessary when the encryption key has 192 bits, and 512 adders are necessary when the encryption key has 256 bits. Even in a structure shown in FIG. 24 in which round sub keys are output one by one, a similar problem occurs when all the round sub keys are calculated simultaneously. In FIG. 24, a round sub key generation circuit 2 includes an exclusive OR circuit 9 for calculating an exclusive OR of bits located at identical positions in different bytes of the encryption key, a register 10, a 3-bit rotation circuit 12, an output selector 14, adders 15, and a bias table 16.

SUMMARY OF THE INVENTION

According to one aspect of the invention, an encryption key generation circuit for generating at least one 128-bit round sub key used in at least one sub round for encryption of 128-bit plaintext, from an encryption key having 64×n bits (2≦n≦4; where n is an integer) includes an exclusive OR circuit for calculating an exclusive OR of 1-bit information located at identical positions in 8-bit information included in each byte of the encryption key so as to generate 1-byte calculation information; a register for storing (8×n+1)-byte information represented by a sum of the encryption key having 8×n bytes and the 1-byte calculation information; a byte rotation circuit for performing byte rotation of rotating the (8×n+1)-byte information by 1 byte in each sub round of the at least one sub round; a 3-bit rotation circuit for performing 3-bit rotation of rotating bits in each byte of the (8×n+1)-byte information by 3 bits in each sub round; and 16 adders for adding a 128-bit bias value to (8×n)-byte information from the lowest byte of the (8×n+1)-byte information processed with the byte rotation and the 3-bit rotation, so as to generate one of the at least one 128-bit round sub key in each sub round.

According to the present invention, selectors are not necessary for changing the order of bytes to be output for each round sub key. Thus, the circuit scale can be reduced.

According to another aspect of the invention, an encryption key generation circuit for generating at least one 128-bit round sub key used in at least one sub round for encryption of 128-bit plaintext, from an encryption key having 64×n bits (2≦n≦4; where n is an integer) includes an exclusive OR circuit for calculating an exclusive OR of 1-bit information located at identical positions in 8-bit information included in each byte of the encryption key so as to generate 1-byte calculation information; a register for storing (8×n+1)-byte information represented by a sum of the encryption key having 8×n bytes and the 1-byte calculation information; a byte/3-bit rotation circuit for performing byte rotation of rotating the (8×n+1)-byte information by 1 byte and performing 3-bit rotation of rotating bits in each byte of the (8×n+1)-byte information by 3 bits, in each sub round of the at least one sub round; and 16 adders for adding a 128-bit bias value to (8×n)-byte information from the lowest byte of the (8×n+1)-byte information processed with the byte rotation and the 3-bit rotation, so as to generate one of the at least one 128-bit round sub key in each sub round.

In an embodiment in which byte rotation and 3-bit rotation are performed simultaneously, the processing time is shortened and the circuit scale is reduced.

According to still another aspect of the invention, an encryption key generation circuit for generating at least one 128-bit round sub key used in at least one sub round for encryption of 128-bit plaintext, from an encryption key having 64×n bits (2≦n≦4; where n is an integer) includes an exclusive OR circuit for calculating an exclusive OR of 1-bit information located at identical positions in 8-bit information included in each byte of the encryption key so as to generate 1-byte calculation information; a register for storing (8×n+1)-byte information represented by a sum of the encryption key having 8×n bytes and the 1-byte calculation information; a byte rotation circuit for performing m-byte rotation (where m is a divider of 8×n), at least once, of rotating the (8×n+1)-byte information by m bytes in each sub round of the at least one sub round; a 3-bit rotation circuit for performing 3-bit rotation of rotating bits in each byte of the (8×n+1)-byte information by 3 bits in each sub round; and m number of adders for adding a (8×m)-bit bias value to each of (8×m)-bit information units in the (8×n)-byte information from the lowest byte of the (8×n+1)-byte information processed with the m-byte rotation and the 3-bit rotation, so as to generate one of the at least one 128-bit round sub key in each sub round.

In one embodiment of the invention, m is 1.

In one embodiment of the invention, m is 2.

In an embodiment in which the bias value which is added once is one byte, only one adder is required instead of 16. The circuit scale can be further reduced.

In an embodiment in which the bias value which is added once is two bytes, only two adders are required instead of 16. The circuit scale can be further reduced.

According to still another aspect of the invention, an encryption key generation circuit for generating at least one 128-bit round sub key used in at least one sub round for encryption of 128-bit plaintext, from an encryption key having 64×n bits (2≦n≦4; where n is an integer) includes an exclusive OR circuit for calculating an exclusive OR of 1-bit information located at identical positions in 8-bit information included in each byte of the encryption key so as to generate 1-byte calculation information; a register for storing (8×n+1)-byte information represented by a sum of the encryption key having 8×n bytes and the 1-byte calculation information; a byte/3-bit rotation circuit for performing m-byte rotation (where m is a divider of 8×n), at least once, of rotating the (8×n+1)-byte information by m bytes in each sub round of the at least one sub round and performing 3-bit rotation of rotating bits in m byte information in the (8×n+1)-byte information by 3 bits in each m byte rotation; and m number of adders for adding a (8×m)-bit bias value to each of (8×m)-bit information units in the (8×n)-byte information from the lowest byte of the (8×n+1)-byte information processed with the m-byte rotation and the 3-bit rotation, so as to generate one of the at least one 128-bit round sub key in each sub round.

In one embodiment of the invention, m is 1.

In one embodiment of the invention, m is 2.

In an embodiment in which 3-bit rotation is performed in one byte while byte rotation is performed, the processing time is shortened and the circuit scale is reduced.

In an embodiment in which 3-bit rotation is performed in two bytes while byte rotation is performed, the processing time is shortened and the circuit scale is reduced.

Thus, the invention described herein makes possible the advantages of providing a small-scale encryption key generation circuit for generating a round sub key, using a SAFER+ encryption algorithm.

These and other advantages of the present invention will become apparent to those skilled in the art upon reading and understanding the following detailed description with reference to the accompanying figures.

BRIEF DESCRIPTION OF THE DRAWINGS

FIG. 1 is a block diagram illustrating a round sub key generation circuit according to a first example of the present invention;

FIG. 16 shows an operation of the round sub key generation circuit shown in FIG. 14;

DESCRIPTION OF THE PREFERRED EMBODIMENTS

Hereinafter, the present invention will be described by way of illustrative examples with reference to the accompanying drawings.

EXAMPLE 1

Figure 20:
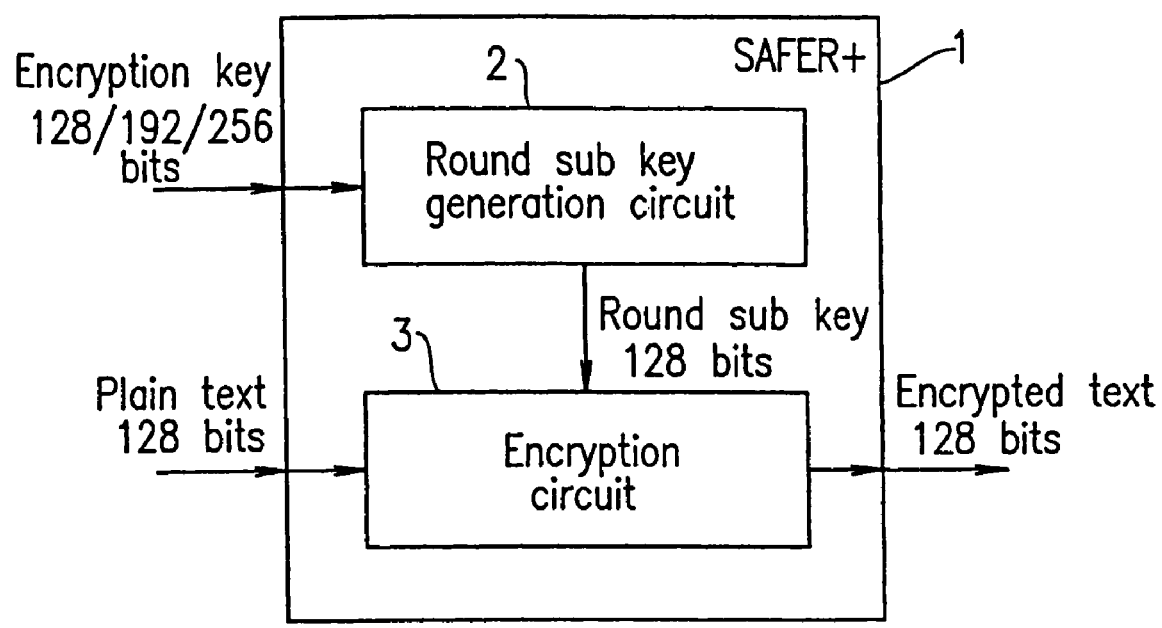
FIG. 20 is a block diagram illustrating an encryption algorithm referred to as SAFER+.

FIG. 1 is a block diagram illustrating a round sub key generation circuit 201 as an encryption key generation circuit according to a first example of the present invention. The round sub key generation circuit 201 is usable instead of the round sub key generation circuit 2 shown in FIG. 20 and is used for performing the SAFER+1 encryption.

The round sub key generation circuit 201 includes an exclusive OR circuit 9, an internal register 10, a byte rotation circuit 11, a 3-bit rotation circuit 12, a bias table 16, and 16 adders 15. In FIG. 1, the 16 adders 15 are represented by one adder symbol for the sake of simplicity.

The exclusive OR circuit 9 divides an input encryption key into 1-byte (8-bit) units, and calculates an exclusive OR of the bits located at identical bit positions in all the 1-byte units so as to output information represented by 1 byte.

The internal register 10 stores data for generating a round sub key. Such data has the number of bytes of the input encryption key+1 byte. The internal register 10 stores the input encryption key, information obtained by byte rotation, and information obtained by 3-bit rotation.

The byte rotation circuit 11 rotates information stored in the internal register 10, which is represented by the bytes of the input encryption key+1 byte, in 1 byte (8 bits) units. The byte rotation circuit 11 basically includes a line and a selector.

Figure 2A:
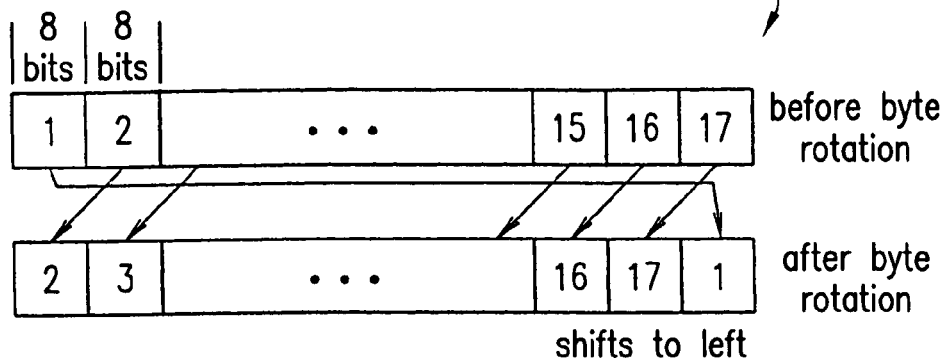
FIGS. 2A and 2B show an operation of a byte rotation circuit in the round sub key generation circuit shown in FIG. 1.

FIG. 2A shows a procedure of performing byte rotation of 17 bytes using the byte rotation circuit 11. In FIG. 2A, each square box represents 1 byte stored in the internal register 10. The numeral in each box represents the ordinal number of the respective byte. More specifically, for example, numeral "1" indicates that information represented by the first byte (or the lowest byte) is stored; numeral "2" indicates that information represented by the second byte is stored; and so on. An upper series of boxes in FIG. 2A represents the state of the internal register 10 before the byte rotation is executed. As shown, the boxes bear sequential numerals from left to right. A lower series of boxes in FIG. 2A represents the state of the internal register 10 after the byte rotation is executed. As shown, information represented by the 17th byte shifts to the 16th box from the left; information represented by the 16th byte shifts to the 15th box from the left; and so on. Information represented by the 2nd byte shifts to the leftmost box; and information represented by the 1st byte shifts to the 17th box from the left.

Figure 2B:
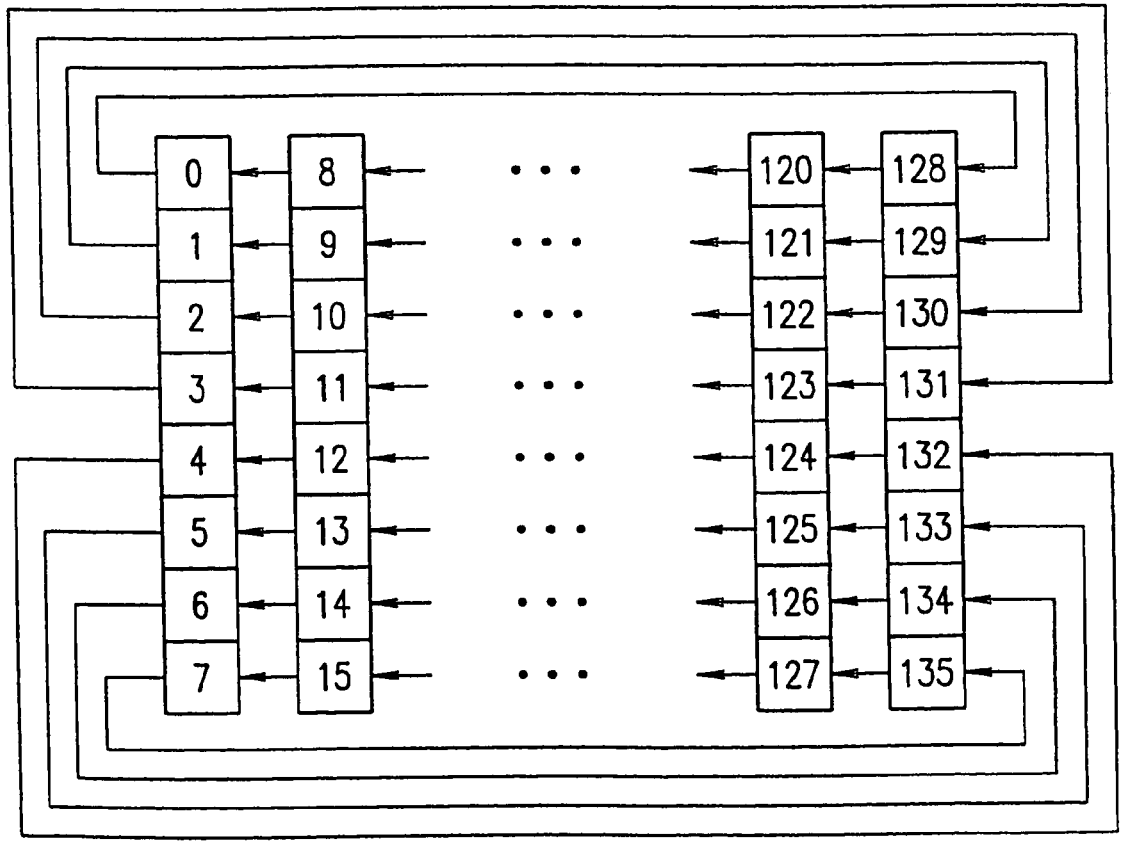

FIG. 2A shows the byte-by-byte state of the internal register 10. FIG. 2B shows a bit-by-bit state of the internal register 10. In FIG. 2B, each square box represents 1 bit stored in the internal register 10. The numeral in each box represents the ordinal number of the respective bit (out of 0th through 135th bits) stored in the internal register 10. More specifically, for example, numeral "0" indicates that information represented by the first bit is stored; numeral "1" indicates that information represented by the second bit is stored; and so on. Eight square boxes of the leftmost column (0th through 7th bits) in FIG. 2B correspond to the leftmost box (1 byte) in FIG. 2A; and eight square boxes of the second-to-the-leftmost column (8th through 15th bits) in FIG. 2B correspond to the second-to-the-leftmost square box (1 byte) in FIG. 2A. Along lines provided between the bits, byte rotation is performed; for example, information represented by the 8th bit shifts to the 0th bit; information represented by the 0th bit shifts to the 128th bit; and so on.

FIG. 2B only shows the lines in addition to the bits for better understanding of the signal flow. In actuality, the byte rotation circuit 11 includes a selector on each line for selecting information which is to be stored in the internal register 10, i.e., information to be processed by byte rotation or information to be processed by other processing.

Figure 3:
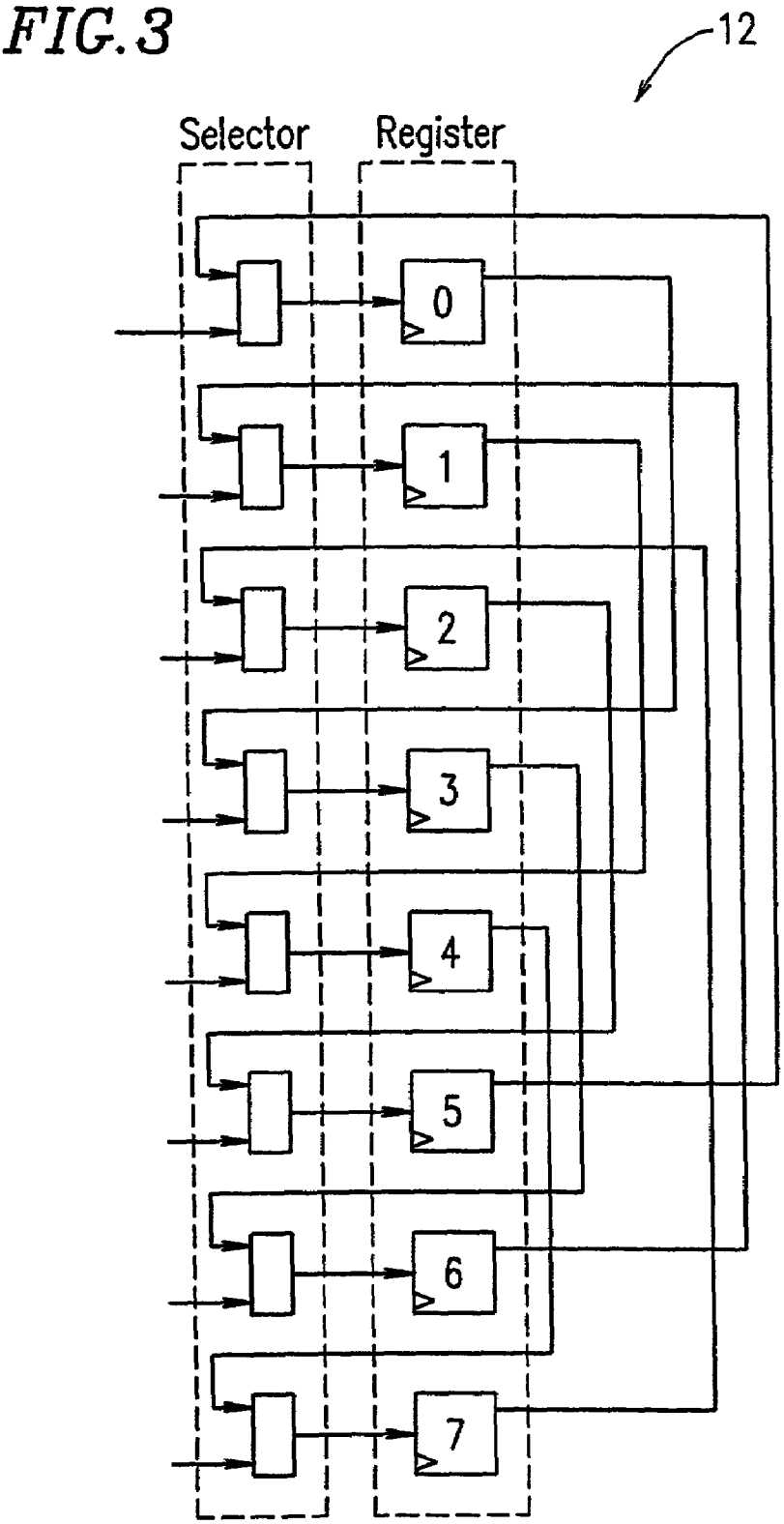
FIG. 3 shows a 3-bit rotation circuit in the round sub key generation circuit shown in FIG. 1.

FIG. 3 illustrates the 3-bit rotation circuit 12. The 3-bit rotation circuit 12 performs 3-bit rotation; i.e., rotates, leftward by 3 bits, information stored in each byte in the internal register 10 (the bytes of the encryption key+1 byte). For example, bits {7, 6, 5, 4, 3, 2, 1, 0} are rotated leftward by 3 bits into bits {4, 3, 2, 1, 0, 7, 6, 5}.

The 3-bit rotation circuit 12 basically includes a line and a selector (described below). In FIG. 3, the 8 square boxes of the right column represent an arbitrary 1 byte (8 bits) among the bytes stored in the internal register 10. Each square box represents 1 bit. The 8 rectangular boxes of the left column each represent a selector. The selector selects information which is to be stored in the internal register 10, i.e., information to be processed by 3-bit rotation or information to be processed by other processing. 3-bit rotation is performed by, for example, shifting information represented by the 7th bit to the 2nd bit, information represented by the 6th bit to the 1st bit, information represented by the 5th bit to the 0th bit, information represented by the 4th bit to the 7th bit, information represented by the 3rd bit to the 6th bit, information represented by the 2nd bit to the 5th bit, information represented by the 1st bit to the 4th bit, and information represented by the 0th bit to the 3rd bit.

The bias table 16 provides a bias value (i.e., fixed value represented by 128 bits) which is determined by a sub round signal (described later).

The adders 15 add values representing information stored in the internal register 10 with the bias value in units of 8 bits with no carry-over. 16 adders 15 are required to perform calculation of 16 bytes (128 bits).

The round sub key generation circuit 201 operates, for example, as follows. Although the manner of processing varies in accordance with the number of bits of the input encryption key, the basic operation is similar. Herein, an operation which is performed when a 128-bit encryption key is input will be described with reference to FIGS. 1 and 4.

Figure 24:
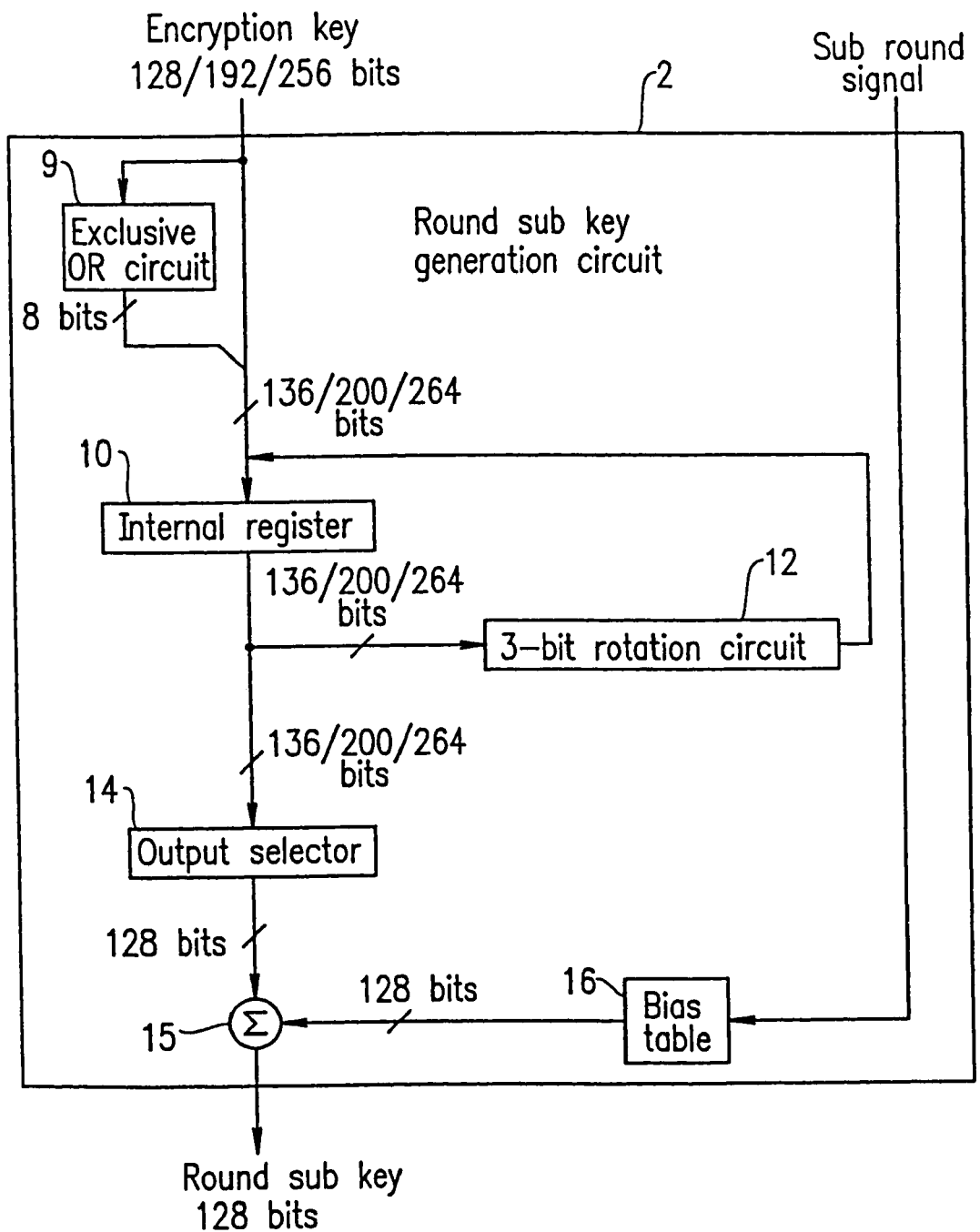
FIG. 24 is a block diagram illustrating a conventional round sub key generation circuit.

The round sub key generation circuit 201 in the first example eliminates the output selector 14 of the conventional round sub key generation circuit 2 shown in FIG. 24 so as to reduce the circuit size. Instead, the round sub key generation circuit 201 includes the byte rotation circuit 11 shown in FIG. 1.

Figure 4:
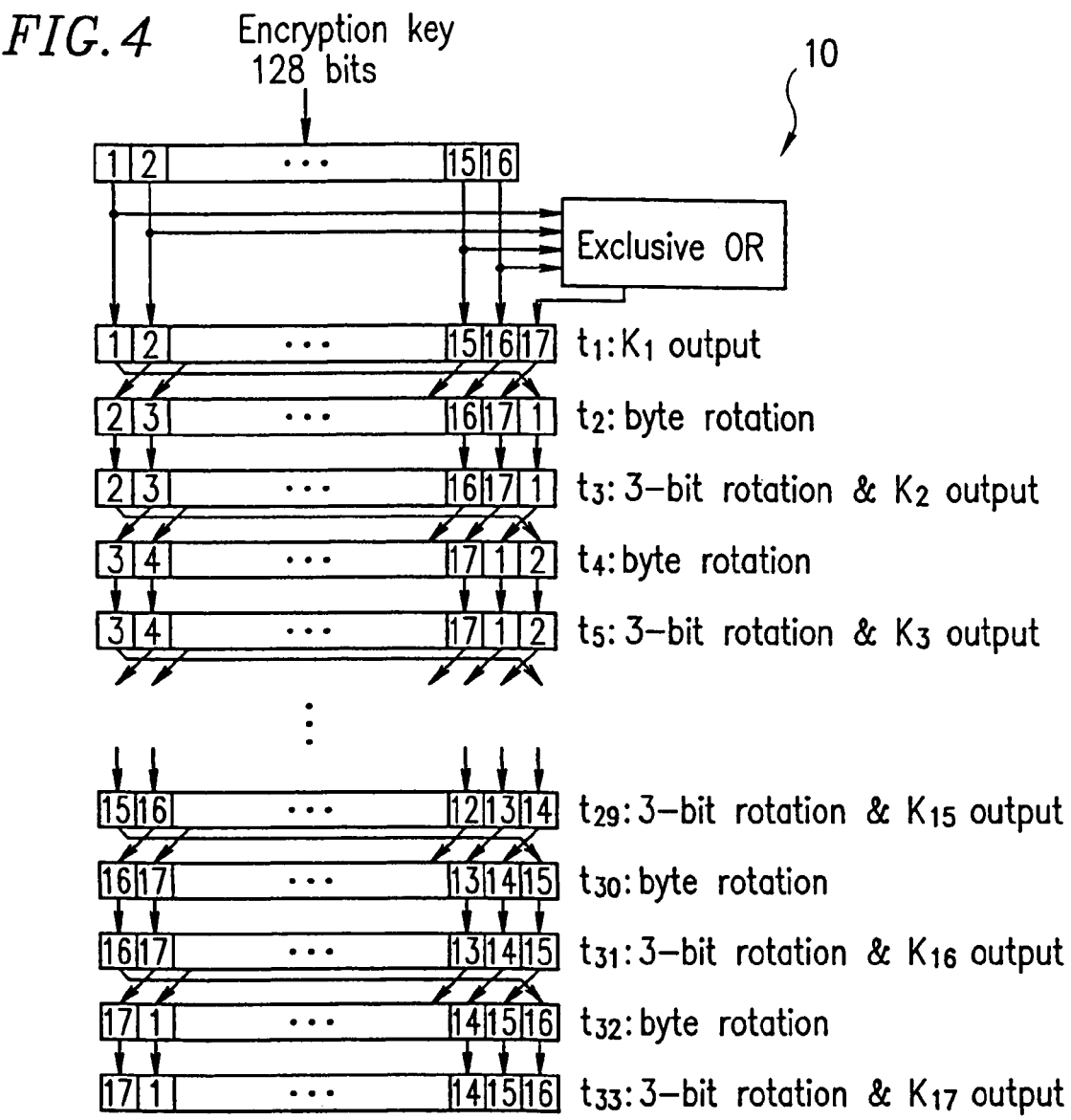
FIG. 4 shows an operation of the round sub key generation circuit shown in FIG. 1.

FIG. 4 illustrates the state of information in the internal register 10 of the round sub key generation circuit 201 along the time axis. In FIG. 4, each square box represents 1 byte stored in the internal register 10. The numeral in each box represents the ordinal number of the respective byte in the encryption key when the encryption key is input. More specifically, for example, numeral "1" indicates that information represented by the first byte in the encryption key when it is input is stored; numeral "2" indicates that information represented by the second byte in the encryption key when it is input is stored; and so on.

At time $t_1$, the internal register 10 stores the input 128-bit encryption key (16 bytes). At this point, the exclusive OR circuit 9 calculates an exclusive OR of information located at identical positions (i.e., bits) in all the 16 bytes of the input encryption key. The resultant value is defined as representing information for the respective position in the 17th byte. For example, an exclusive OR of information represented by the 0th bit in all the 16 bytes is calculated, and the resultant value is defined as representing information for the 0th bit of the 17th byte. Then, information represented by the lowest 16 bytes is output from the adders 15 as a round sub key $K_1$. The information which is output is pre-byte rotation information, and thus is the information represented by the input encryption key.

Next, at time $t_2$, the byte rotation circuit 11 performs byte rotation. Namely, as shown in FIG. 4, the bytes are rotated leftward by 1 byte. More specifically, for example, information represented by the lowest byte shifts to the rightmost box. Information represented by the 2nd byte shifts to the leftmost box; information represented by the 3rd byte shifts to the second box from the left; and so on.

Figure 21:
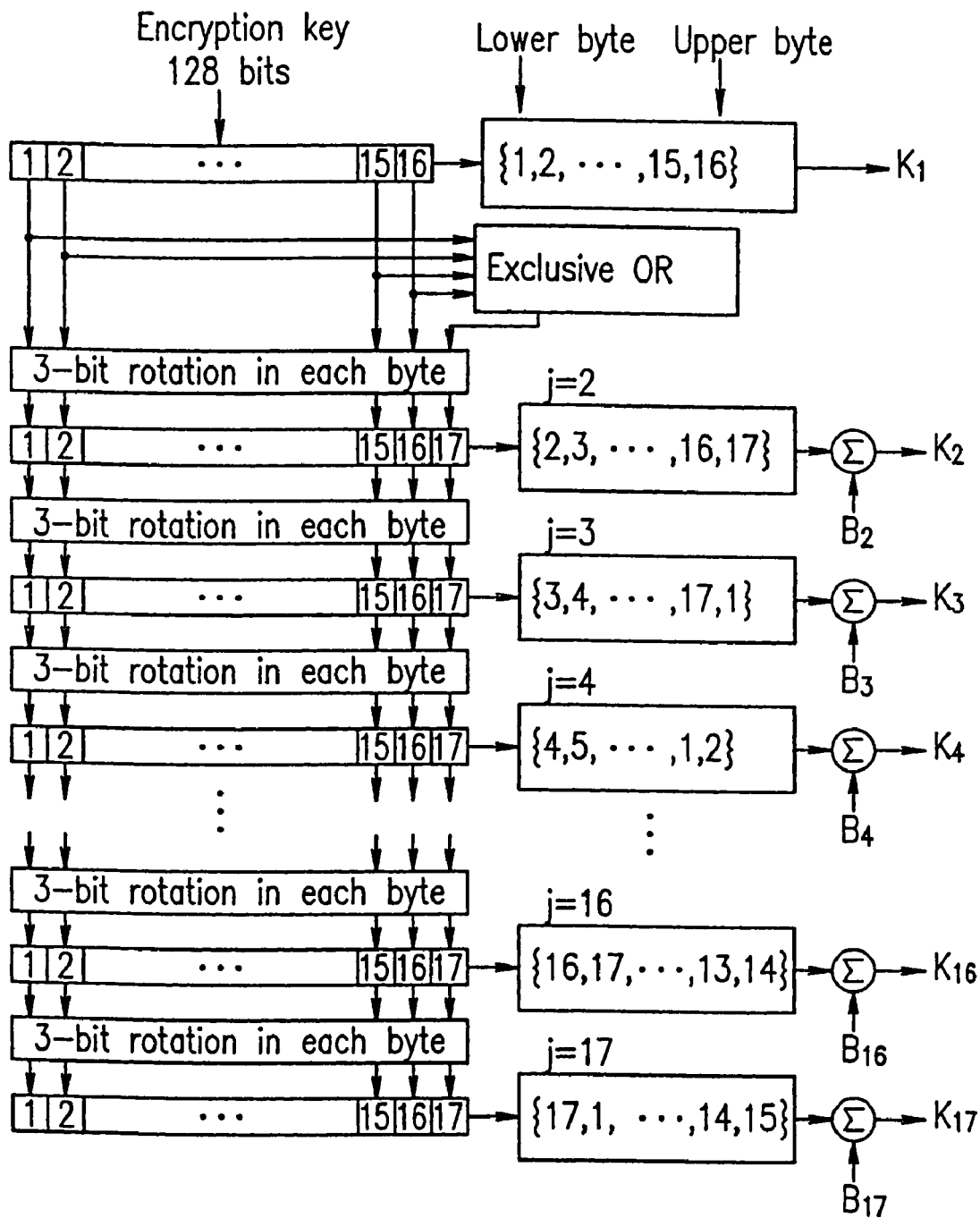
FIG. 21 shows a procedure for producing a round sub key when the encryption key has 128 bits.
Figure 22:
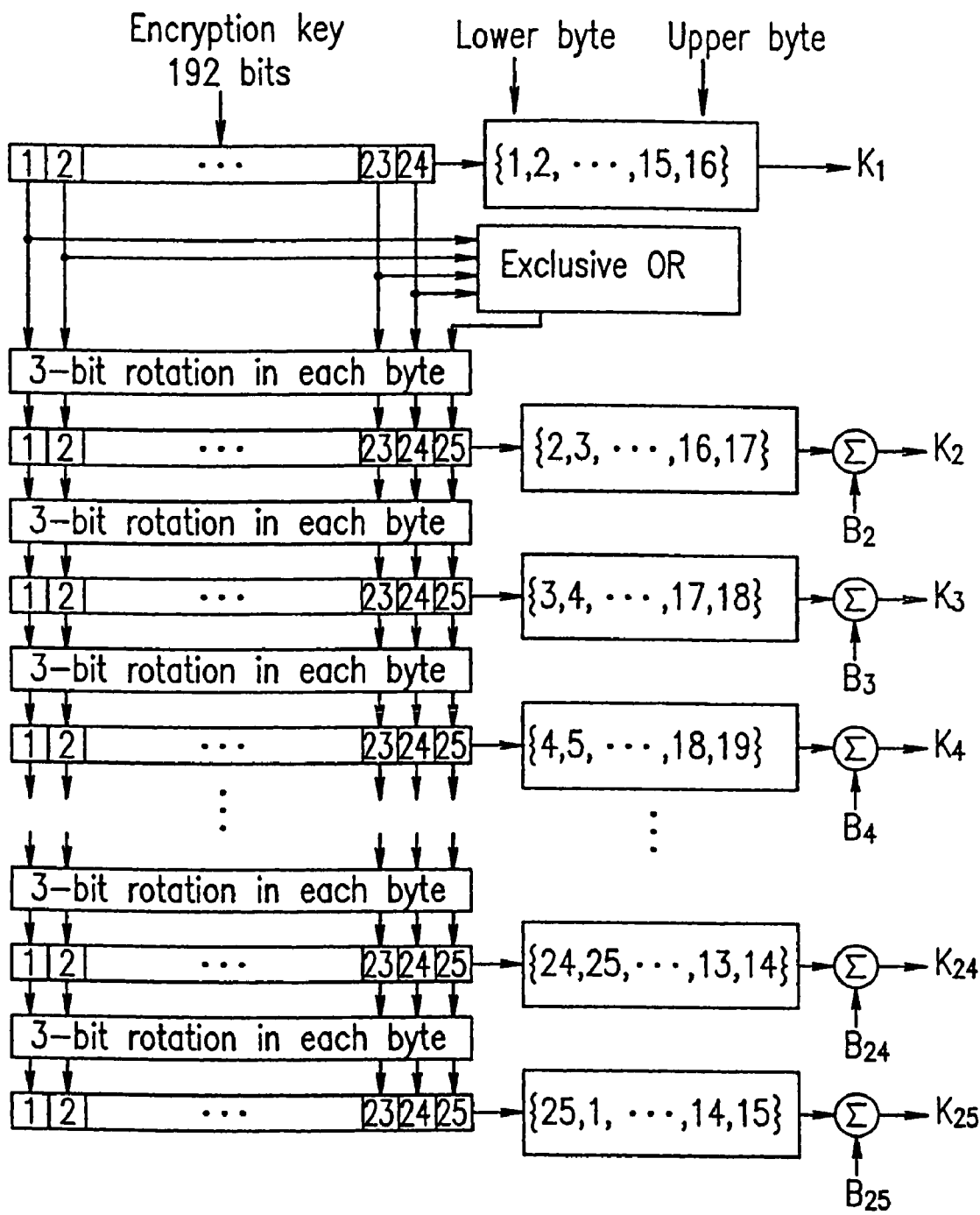
FIG. 22 shows a procedure for producing a round sub key when the encryption key has 196 bits.
Figure 23:
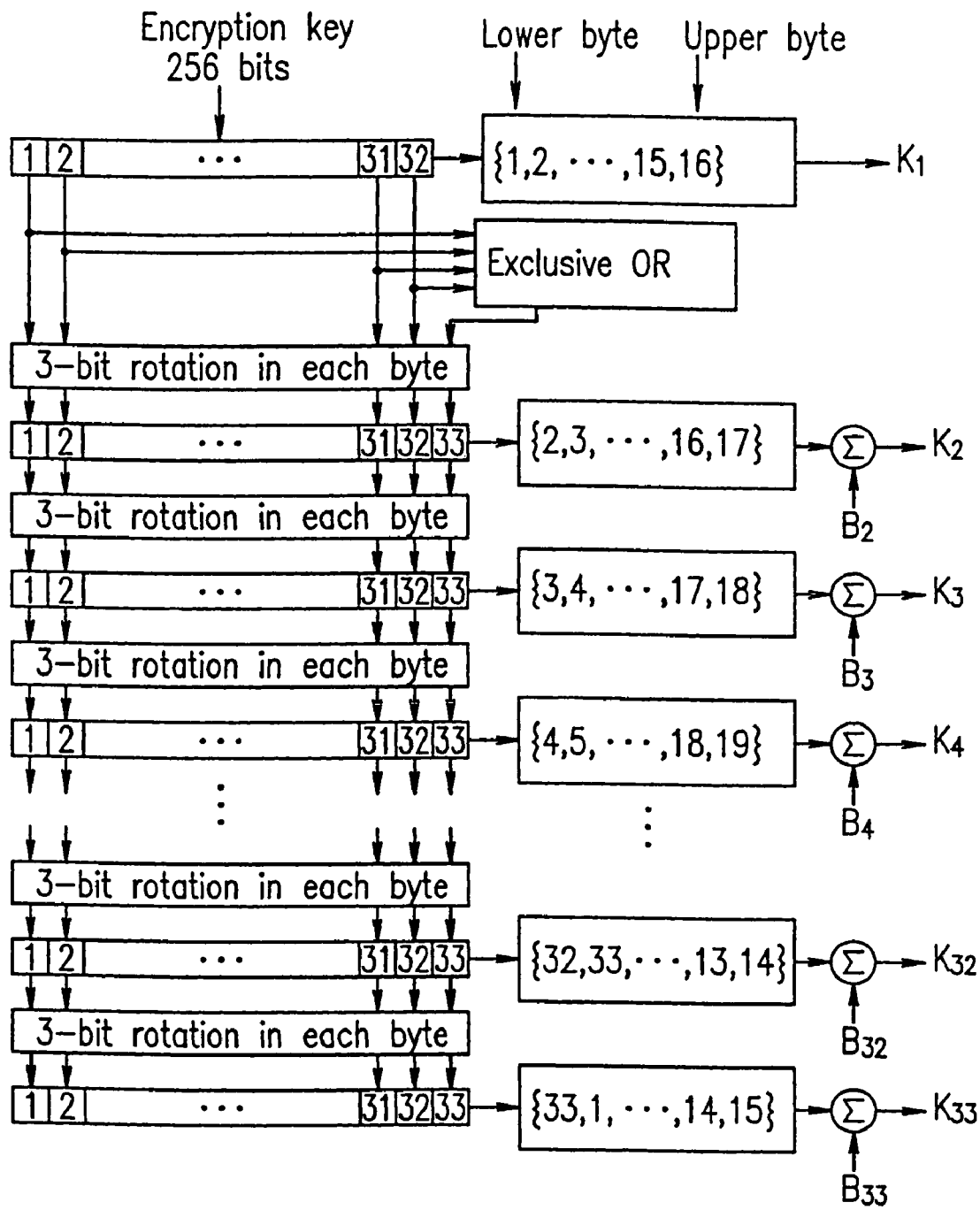
FIG. 23 shows a procedure for producing a round sub key when the encryption key has 256 bits.

Then, at time $t_3$, the 3-bit rotation circuit 12 performs 3-bit rotation in each byte. Then, information represented by the lowest 16 bytes through the adders 15 is output as a round sub key $K_2$. The order of the 16 bytes in the round sub key $K_2$ shown in FIG. 4 is identical with the order of the 16 bytes in the round sub key $K_2$ shown in FIG. 21. Therefore, it is not necessary to select the order of the bytes to be output.

At time $t_4$, byte rotation is performed. At time $t_5$, 3-bit rotation is performed in each byte. Then, a round sub key $K_3$ is output from the adders 15. Again, the order of the 16 bytes in the round sub key $K_3$ shown in FIG. 4 is identical with the order of the 16 bytes in the round sub key $K_3$ shown in FIG. 21. Therefore, it is not necessary to select the order of the bytes to be output.

Thereafter, byte rotation and 3-bit rotation are performed in a similar manner. Thus, a desired round sub key among the round sub keys $K_1$ through $K_{17}$ can be obtained without using an output selector. In the case where a 192-bit encryption key or a 256-bit encryption key is input, a similar procedure can be performed to obtain a desired round sub key.

The conventional round sub key generation circuit 2 shown in FIG. 24 requires information stored in the internal register 10 to be selected by the output selector 14 in order to output each bit of the round sub key. The output selector 14 needs to have a large scale for the following reasons. One bit is selected from 17 bits when the input encryption key has 128 bits, from 25 bits when the input encryption key has 192 bits, and from 33 bits when the input encryption key has 256 bits; and such selection is performed for each of 128 bits of the round sub key.

By contrast, the round sub key generation circuit 201 in the first example rotates information represented by the bytes in the internal register 10. Therefore, a desired round sub key can be output so long as the round sub key generation circuit 201 includes lines along which information represented by the bytes in the internal register 10 are rotated, and selectors. As a consequence, the round sub key generation circuit 201 can have a reduced size.

EXAMPLE 2

Figure 5:
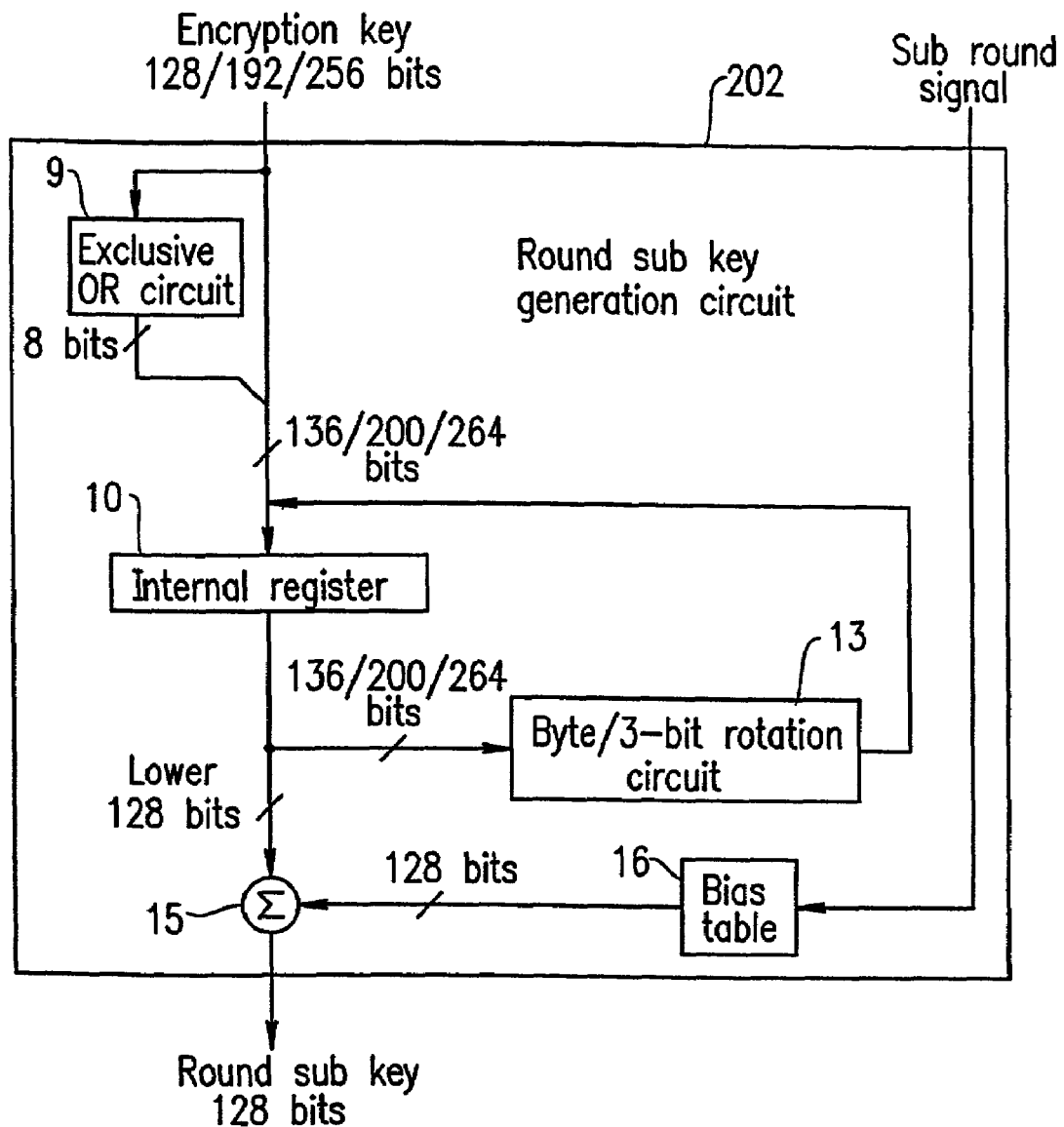
FIG. 5 is a block diagram illustrating a round sub key generation circuit according to a second example of the present invention.

FIG. 5 is a block diagram illustrating a structure of a round sub key generation circuit 202 as an encryption key generation circuit according to a second example of the present invention. The round sub key generation circuit 202 is usable instead of the round sub key generation circuit 2 shown in FIG. 20 and is used for performing the SAFER+1 encryption.

The round sub key generation circuit 202 includes an exclusive OR circuit 9, an internal register 10, a byte/3-bit rotation circuit 13, a bias table 16, and 16 adders 15. In FIG. 5, the 16 adders 15 are represented by one adder symbol for the sake of simplicity.

The round sub key generation circuit 202 performs byte rotation and 3-bit rotation in the same cycle of processing by the byte/3-bit rotation circuit 13. Therefore, the round sub key generation circuit 202 shortens the processing time and has a reduced size.

Figure 6:
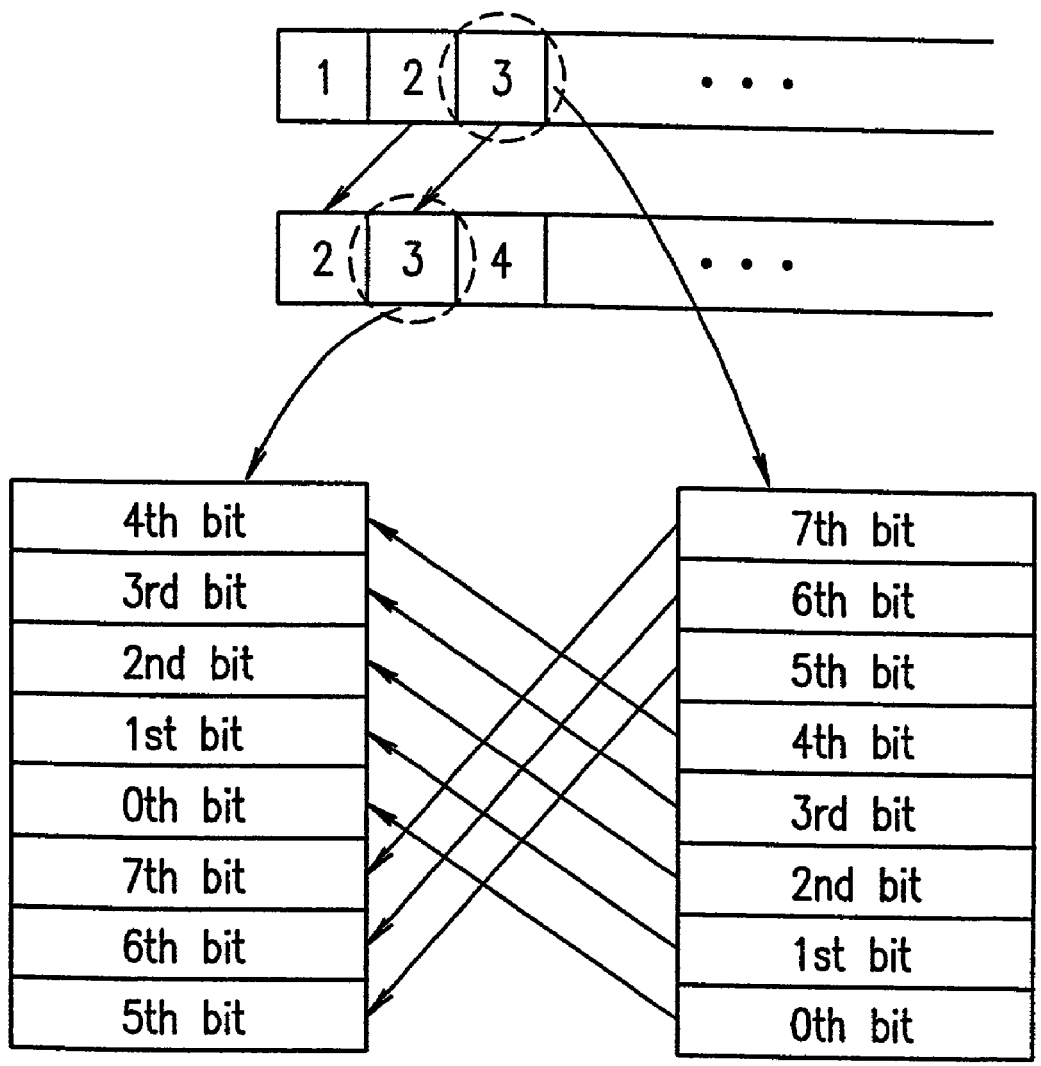
FIG. 6 shows an operation of a byte/3-bit rotation circuit in the round sub key generation circuit shown in FIG. 5.

Referring to FIG. 6, the byte/3-bit rotation circuit 13 rotates information stored in the internal register 10, which is represented by the bytes of the input encryption key+1 byte, in 1 byte (8 bits) units, while rotating, leftward by 3 bits, information stored in each byte. In the byte rotation performed in the first example, the information represented by, for example, the 7th bit of one byte shifts to the 7th bit of another byte. In the second example, byte rotation and 3-bit rotation are performed concurrently. Therefore, the information represented by, for example, the 7th bit of one byte shifts to the 2nd bit of another byte.

Figure 7:
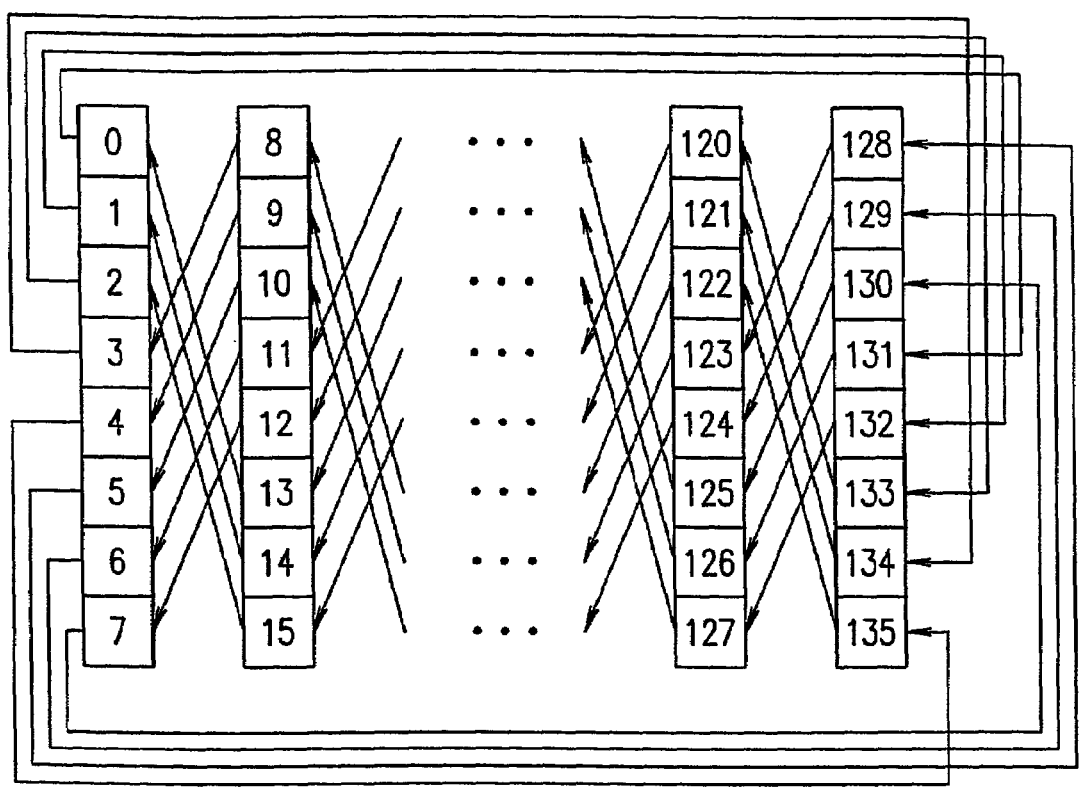
FIG. 7 shows an operation of a byte/3-bit rotation circuit in the round sub key generation circuit shown in FIG. 5.

FIG. 6 shows a change of information in one particular byte in the internal register 10. FIG. 7 shows a change of information in a plurality of bytes in the internal register 10. FIG. 7 only shows the lines in addition to the bits for better understanding of the signal flow. In actuality, the byte/3-bit rotation circuit 13 includes a selector on each line for selecting information which is to be stored in the internal register 10, i.e., information to be processed by byte/3-bit rotation or information to be processed by other processing.

The round sub key generation circuit 202 operates, for example, as follows. Although the manner of processing varies in accordance with the number of bits of the input encryption key, the basic operation is similar. Herein, an operation which is performed when a 128-bit encryption key is input will be described with reference to FIGS. 5 and 8.

Figure 8:
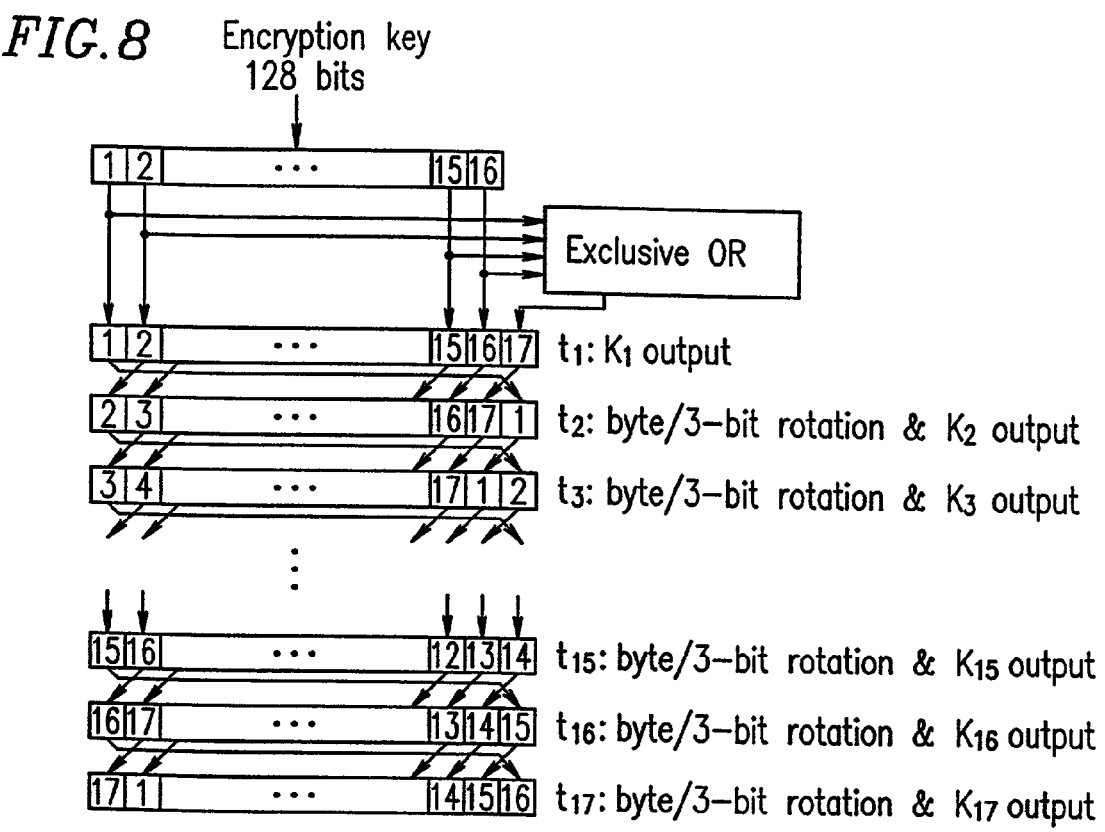
FIG. 8 shows an operation of the round sub key generation circuit shown in FIG. 5.

FIG. 8 illustrates the state of information in the internal register 10 of the round sub key generation circuit 202 along the time axis.

At time $t_1$, the internal register 10 stores the input 128-bit encryption key (16 bytes). At this point, the exclusive OR circuit 9 calculates an exclusive OR of information located at identical positions (i.e., bits) in all the 16 bytes of the input encryption key. The resultant value is defined as representing information for the respective position in the 17th byte. Then, information represented by the lowest 16 bytes through the adders 15 is output as a round sub key $K_1$.

Next, at time $t_2$, the byte/3-bit rotation circuit 13 performs byte rotation and 3-bit rotation concurrently, so that a round sub key $K_2$ is output from the adders 15. Namely, as shown in FIG. 8, the byte rotation performed at time $t_2$ and the 3-bit rotation performed at time $t_3$ in FIG. 4 are performed concurrently. Therefore, the processing time required for outputting one round sub key is shortened by the time required for one step.

Thereafter, byte rotation and 3-bit rotation are performed concurrently in a similar manner to obtain a desired round sub key among the round sub keys $K_1$ through $K_{17}$. In the case where a 192-bit encryption key or a 256-bit encryption key is input, a similar procedure can be performed to obtain a desired round sub key.

The processing which requires 33 steps in the first example can be performed in 17 steps.

In terms of circuit size, the selectors provided in each of the byte rotation circuit 11 and the 3-bit rotation circuit 12 in the first example can be commonly used in the second example. Therefore, the number of selectors can be reduced to half as compared to the first example.

EXAMPLE 3

Figure 9:
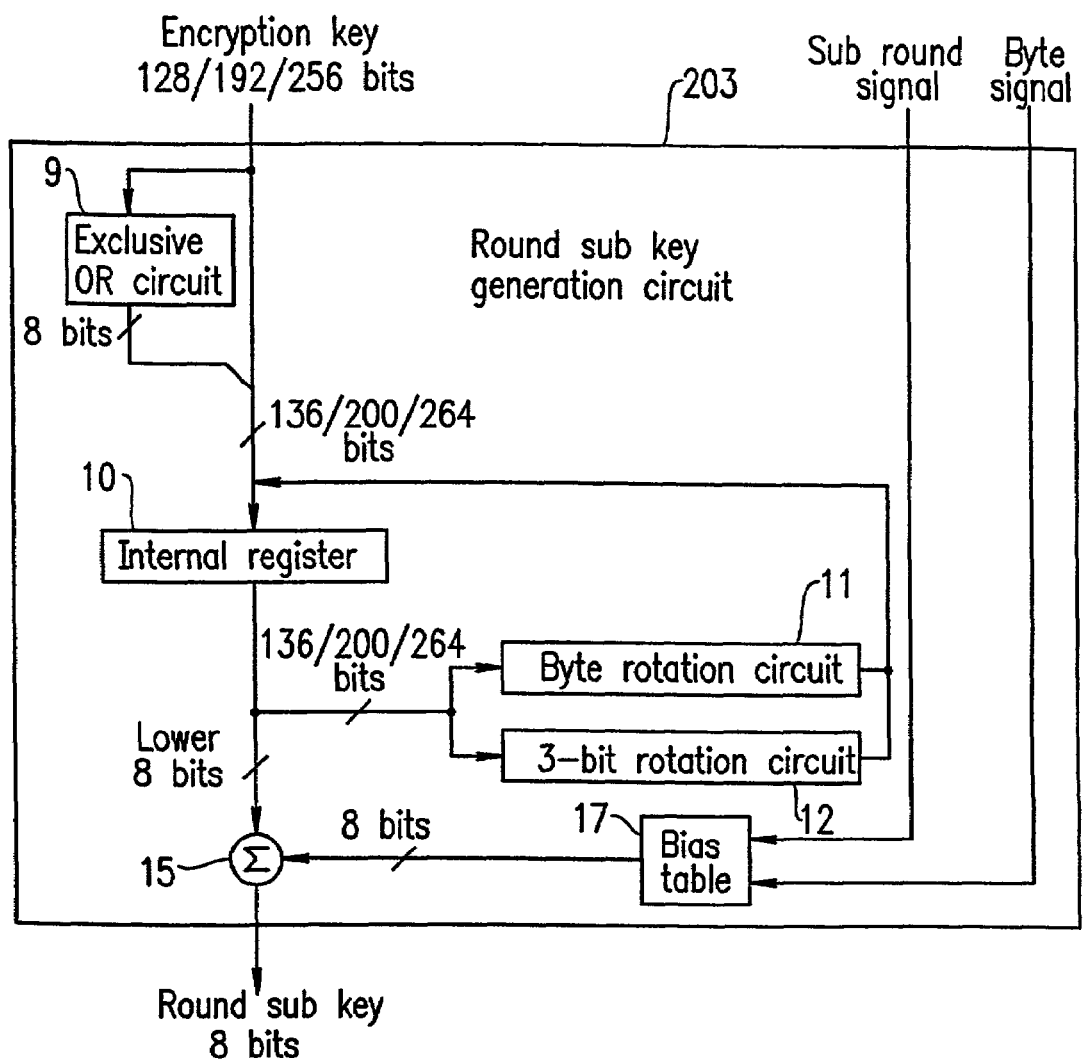
FIG. 9 is a block diagram illustrating a round sub key generation circuit according to a third example of the present invention.

FIG. 9 is a block diagram illustrating a round sub key generation circuit 203 as an encryption key generation circuit according to a third example of the present invention. The round sub key generation circuit 203 is usable instead of the round sub key generation circuit 2 shown in FIG. 20 and is used for performing the SAFER+1 encryption.

The round sub key generation circuit 203 includes an exclusive OR circuit 9, an internal register 10, a byte rotation circuit 11, a 3-bit rotation circuit 12, a bias table 17, and one adder 15.

The round sub key generation circuit 203 outputs a round sub key for each sub round, like the round sub key generation circuit 201 in the first example. Whereas the round sub key generation circuit 201 outputs the 128-bit round sub key simultaneously, the round sub key generation circuit 203 outputs the 128-bit round sub key in 8 bits by 8 bits. In addition, an 8-bit bias value is determined by a sub round signal and a byte signal in the bias table 17. A "sub round signal" designates the number of each sub round, and a "byte signal" represents the ordinal number, in the round sub key, of the lowest byte of the internal register 10. Since the bias value which is added at one time is 1 byte, only one adder 15 is required instead of 16. This further reduces the circuit size.

The round sub key generation circuit 203 operates, for example, as follows. Although the manner of processing varies in accordance with the number of bits of the input encryption key, the basic operation is similar. Herein, an operation which is performed when a 128-bit encryption key is input will be described with reference to FIGS. 9 and 10.

The round sub key generation circuit 203 in the third example eliminates the output selector 14 in the conventional round sub key generation circuit 2 shown in FIG. 24 and includes only one adder 15 instead of 16, so as to reduce the circuit size. Instead, the round sub key generation circuit 203 includes the byte rotation circuit 11 shown in FIG. 9. Whereas the round sub key generation circuit 201 in the first example outputs information represented by 16 bytes in the internal register 10 simultaneously, the round sub key generation circuit 203 outputs only the lowest byte in the internal register 10.

Figure 10:
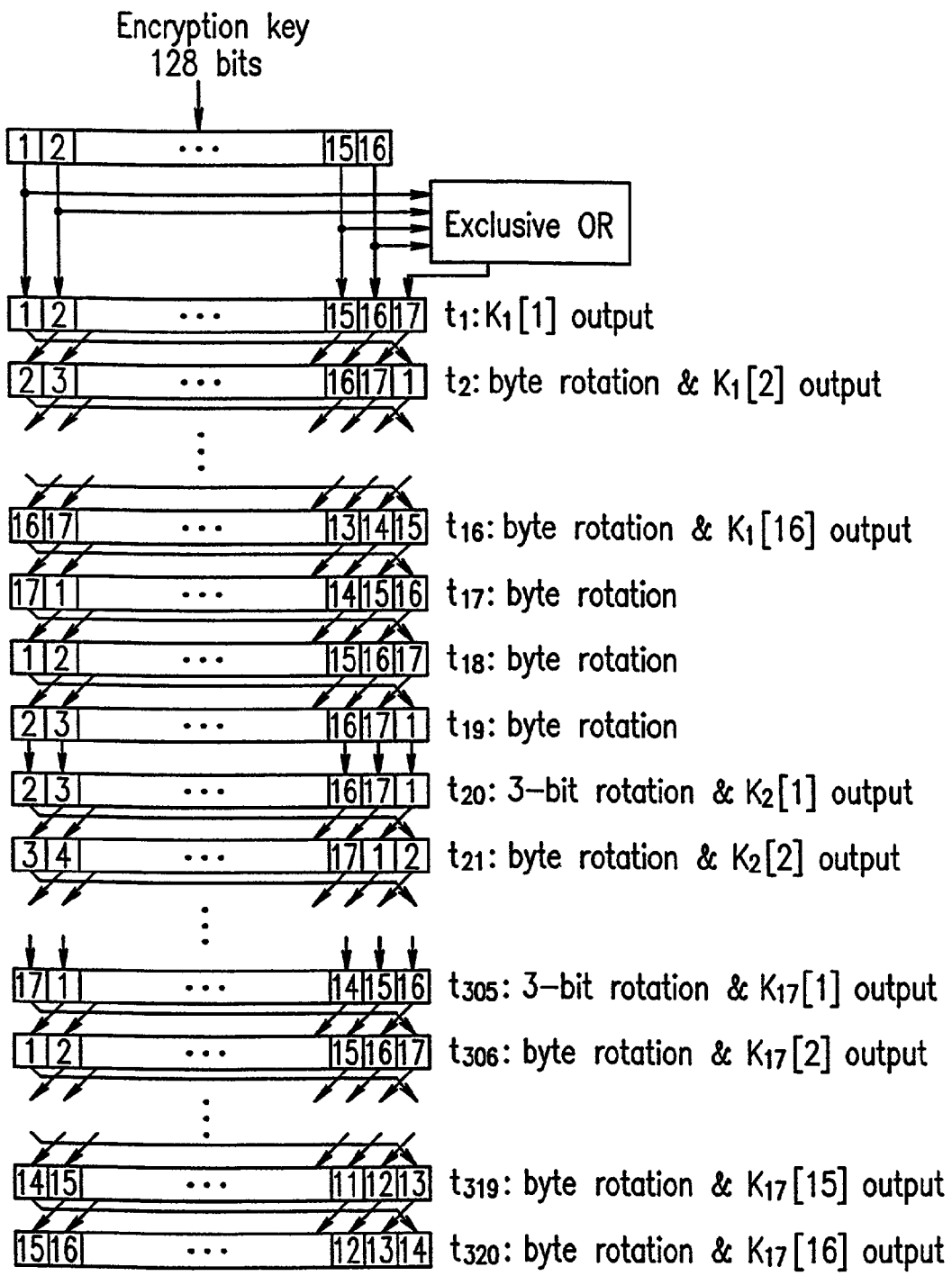
FIG. 10 shows an operation of a round sub key generation circuit shown in FIG. 9.

FIG. 10 illustrates the state of information in the internal register 10 of the round sub key generation circuit 203 along the time axis. In FIG. 10, each square box represents 1 byte stored in the internal register 10. The numeral in each box represents the ordinal number of the respective byte in the encryption key when the encryption key is input. $K_j$ [i] represents the ith byte of the round sub key $K_j$ including 16 bytes (128 bits).

At time $t_1$, the internal register 10 stores the input 128-bit encryption key (16 bytes). At this point, the exclusive OR circuit 9 calculates an exclusive OR of information located at identical positions (i.e., bits) in all the 16 bytes of the input encryption key. The resultant value is defined as representing information for the respective position in the 17th byte. Then, the internal register 10 outputs information represented by the lowest byte to the adder 15. At time $t_1$, information represented by the 1st byte of the round sub key $K_1$ (i.e., $K_1[1]$) is output.

Next, at time $t_2$, the byte rotation circuit 11 performs byte rotation. Namely, as shown in FIG. 10, the bytes are rotated leftward by 1 byte. More specifically, for example, information represented by the lowest byte shifts to the rightmost box. Then, information represented by the lowest byte is output to the adder 15. At time $t_2$, information represented by the 2nd byte of the round sub key $K_1$ (i.e., $K_1[2]$) is output.

The above-described steps are repeated until time $t_{16}$. In this manner, information represented by the lowest byte in the round sub key $K_1$ is output sequentially, until information represented by all the 128 bits is output.

At time $t_{17}$, $t_{18}$ and $t_{19}$, only byte rotation is performed in order to adjust information represented by the 1st byte of the next sub round to be at the lowest byte.

At time $t_{20}$, 3-bit rotation is performed in each byte of the internal register 10. Thus, the round sub key generation circuit 203 is ready to output a round sub key $K_2$. Then, a round sub key $K_2[1]$ is output.

Thereafter, byte rotation and 3-bit rotation are performed in a similar manner. Thus, information represented by a desired byte of a desired round sub key among the round sub keys $K_1$ through $K_{17}$ can be obtained without using an output selector.

In order to add a bias value, a 1-byte bias value which is determined by a sub round signal and a byte signal needs to be output since 1-byte information is output from the internal register 10 in one step.

In the case where a 192-bit encryption key or a 256-bit encryption key is input, a similar procedure can be performed to obtain information represented by a desired byte of a desired round sub key.

EXAMPLE 4

Figure 11:
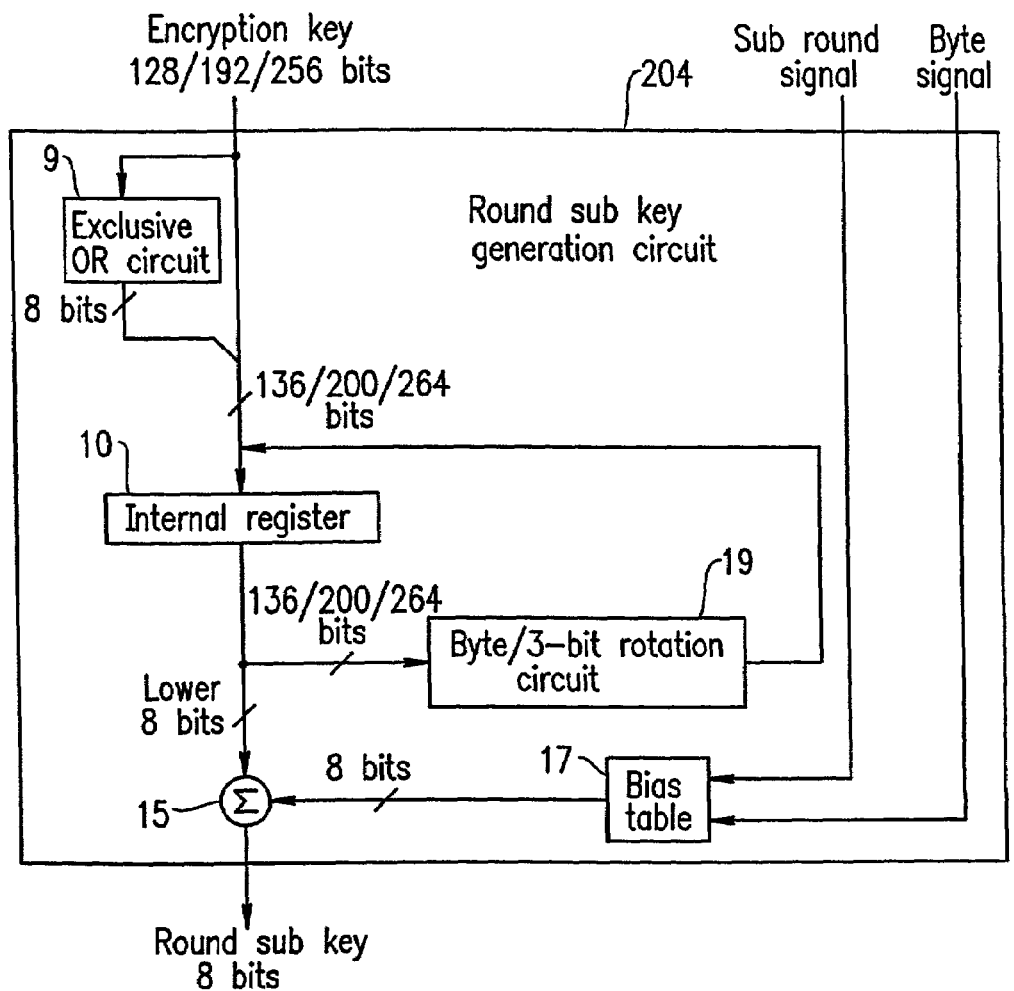
FIG. 11 is a block diagram illustrating a round sub key generation circuit according to a fourth example of the present invention.

FIG. 11 is a block diagram illustrating a round sub key generation circuit 204 as an encryption key generation circuit according to a fourth example of the present invention. The round sub key generation circuit 204 is usable instead of the round sub key generation circuit 2 shown in FIG. 20 and is used for performing the SAFER+1 encryption.

The round sub key generation circuit 204 includes an exclusive OR circuit 9, an internal register 10, a byte/3-bit rotation circuit 19, a bias table 17, and one adder 15.

The round sub key generation circuit 204 performs byte rotation and 3-bit rotation in the same cycle of processing by the byte/3-bit rotation circuit 19. Therefore, the round sub key generation circuit 204 shortens the processing time and has a reduced size.

Figure 12:
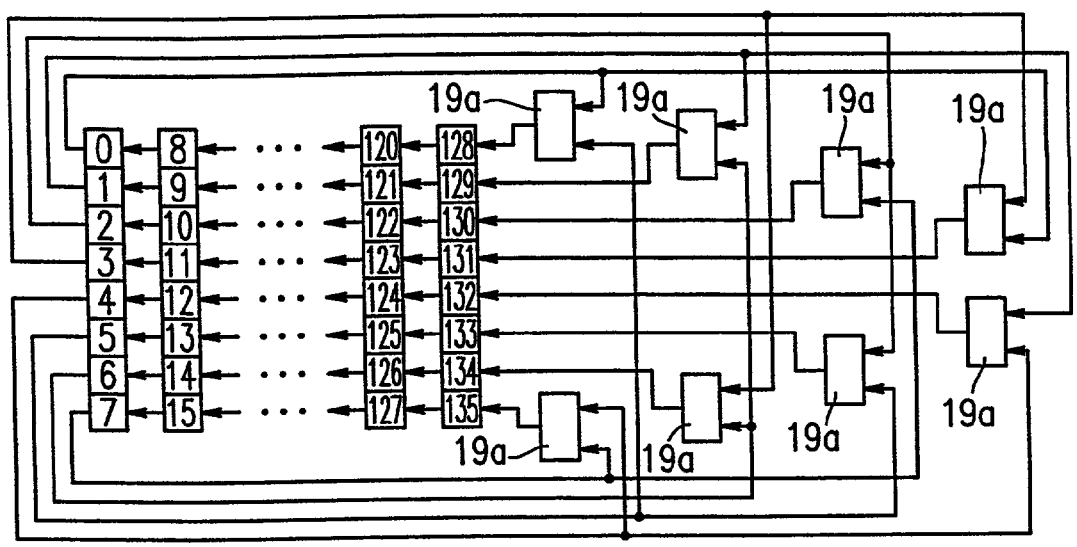
FIG. 12 shows a byte/3-bit rotation circuit in the round sub key generation circuit shown in FIG. 11.

As shown in FIG. 12, the byte/3-bit rotation circuit 19 performs 3-bit rotation only in the lowest byte, which shifts to the rightmost box. Information represented by the (j+1)th byte shifts to the jth byte. 3-bit rotation is performed only in the lowest byte, which shifts to the rightmost box. The byte/3-bit rotation circuit 19 may shift the information represented by the lowest byte to the highest byte with no 3-bit rotation. In this case, the byte/3-bit rotation circuit 19 has substantially the same function as that of the byte rotation circuit 11 in the third example.

The byte/3-bit rotation circuit 19 includes, in addition to the structure of the byte rotation circuit 11 shown in FIG. 2B, lines and selectors 19a (represented by rectangular boxes in FIG. 12) for selecting whether 3-bit rotation is to be performed or not when the information represented by the lowest byte shifts to the rightmost box. As described above, when simple byte rotation is performed without 3-bit rotation, the byte/3-bit rotation circuit 19 has substantially the same function as that of the byte rotation 11 in the third example.

FIG. 12 only shows the lines and selectors 19a in addition to the bits for better understanding of the signal flow. In actuality, the byte/3-bit rotation circuit 19 includes a selector on each line for selecting information which is to be stored in the internal register 10, i.e., information to be processed by byte/3-bit rotation (or byte rotation) or information to be processed by other processing.

The round sub key generation circuit 204 operates, for example, as follows. Although the manner of processing varies in accordance with the number of bits of the input encryption key, the basic operation is similar. Herein, an operation which is performed when a 128-bit encryption key is input will be described with reference to FIGS. 11 and 13.

The round sub key generation circuit 204 in the fourth example eliminates the output selector 14 in the conventional round sub key generation circuit 2 shown in FIG. 24 and includes only one adder 15 instead of 16, so as to reduce the circuit size. Instead, the round sub key generation circuit 204 includes the byte/3-bit rotation circuit 19 shown in FIG. 11. The round sub key generation circuit 204 outputs only the lowest byte in the internal register 10, like the round sub key generation circuit 203.

Figure 13:
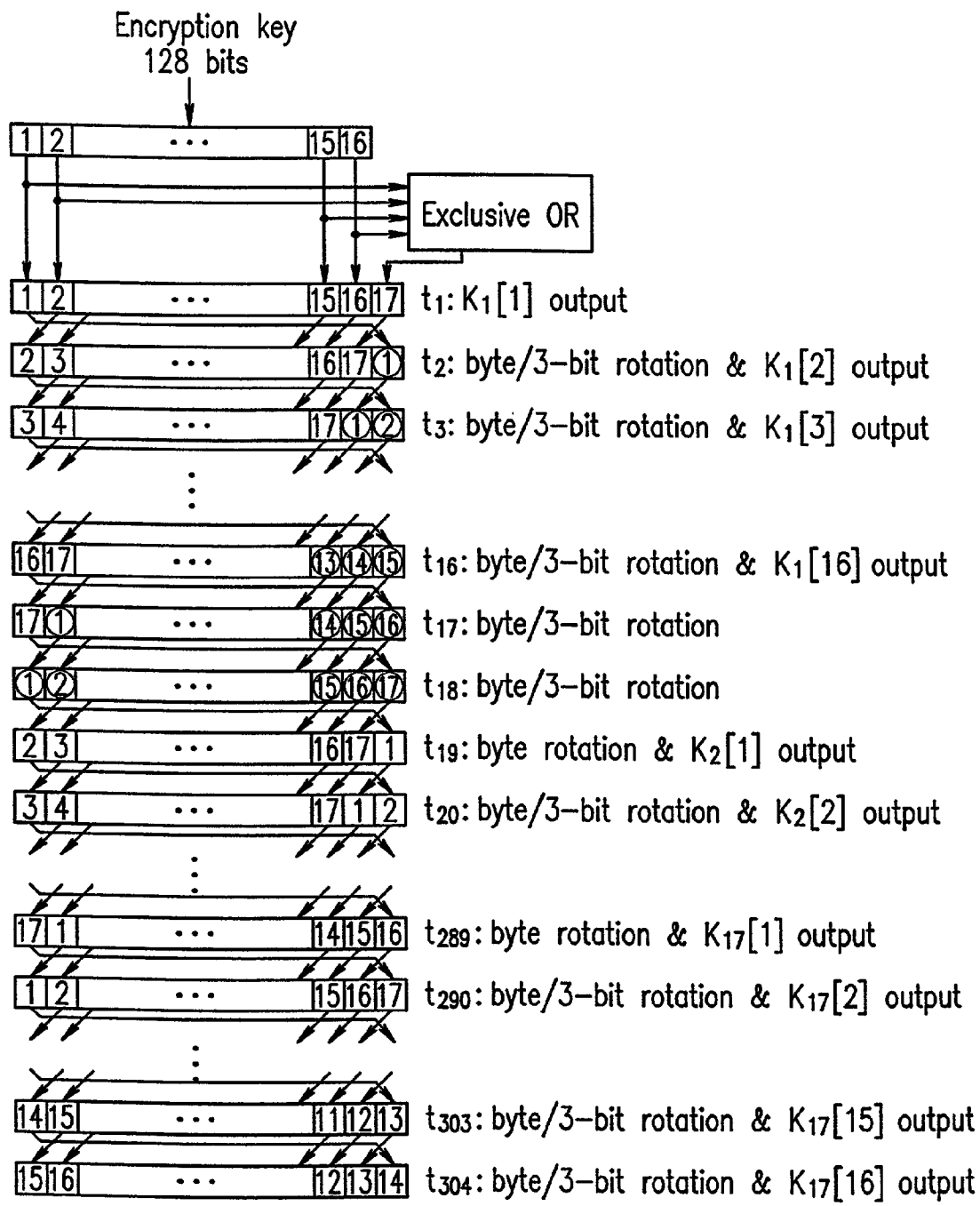
FIG. 13 shows an operation of the round sub key generation circuit shown in FIG. 11.

FIG. 13 illustrates the state of information in the internal register 10 of the round sub key generation circuit 204 along the time axis. In FIG. 13, each square box represents 1 byte stored in the internal register 10. The numeral in each box represents the ordinal number of the respective byte in the encryption key when the encryption key is input. $K_j[i]$ represents the ith byte of the round sub key $K_j$ including 16 bytes (128 bits).

At time $t_1$, the internal register 10 stores the input 128-bit encryption key (16 bytes). At this point, the exclusive OR circuit 9 calculates an exclusive OR of information located at identical positions (i.e., bits) in all the 16 bytes of the input encryption key. The resultant value is defined as representing information for the respective position in the 17th byte. Then, the internal register 10 outputs information represented by the lowest byte to the adder 15. At time $t_1$, information represented by the 1st byte of the round sub key (i.e., $K_1[1]$) is output.

Next, at time $t_2$, the byte/3-bit rotation circuit 19 performs byte rotation and 3-bit rotation concurrently. The 3-bit rotation is performed only in the lowest byte, which shifts to the rightmost box. Information in the other bytes are shifted leftward by 1 byte. The internal register 10 outputs information represented by the lowest byte to the adder 15. At time $t_2$, information represented by the lowest byte of a round sub key $K_1$ (i.e., $K_1[2]$) is output. In FIG. 13, during the processing of the round sub key $K_1$, the numerals of the rotated bytes in which 3-bit rotation is finished are circled.

The above-described steps are repeated until time $t_{16}$. In this manner, information represented by the lowest byte in the round sub key $K_1$ is output sequentially, until information represented by all the 128 bits is output.

At time $t_{17}$ and $t_{18}$, byte rotation and 3-bit rotation (only in the lowest byte, which shifts to the rightmost box) are performed in order to adjust information represented by the 1st byte of the next sub round to be at the lowest byte. When processing up to time $t_{18}$ is finished, the numerals of all the bytes in the internal register 10 are circled. This indicates that 3-bit rotation is performed in all the bytes, and that the round sub key generation circuit 204 is ready to output a round sub key $K_2$.

At time $t_{19}$, byte rotation is performed, and the round sub key generation circuit 204 outputs a round sub key $K_2[1]$. At time $t_{19}$, no 3-bit rotation is performed.

Thereafter, byte rotation and 3-bit rotation are performed in a similar manner. Thus, information represented by a desired byte of a desired round sub key among the round sub keys $K_1$ through $K_{17}$ can be obtained without using an output selector.

The bias table 17 outputs a 1-byte bias value which is determined by a sub round signal and a byte signal.

In the case where a 192-bit encryption key or a 256-bit encryption key is input, a similar procedure can be performed to obtain information represented by a desired byte of a desired round sub key.

In the fourth example, 3-bit rotation is performed simultaneously with the byte rotation. Therefore, the processing time required for outputting one round sub key is shortened by the time required for one step. The processing which requires 320 steps in the third example can be performed in 304 steps in the fourth example.

EXAMPLE 5

Figure 14:
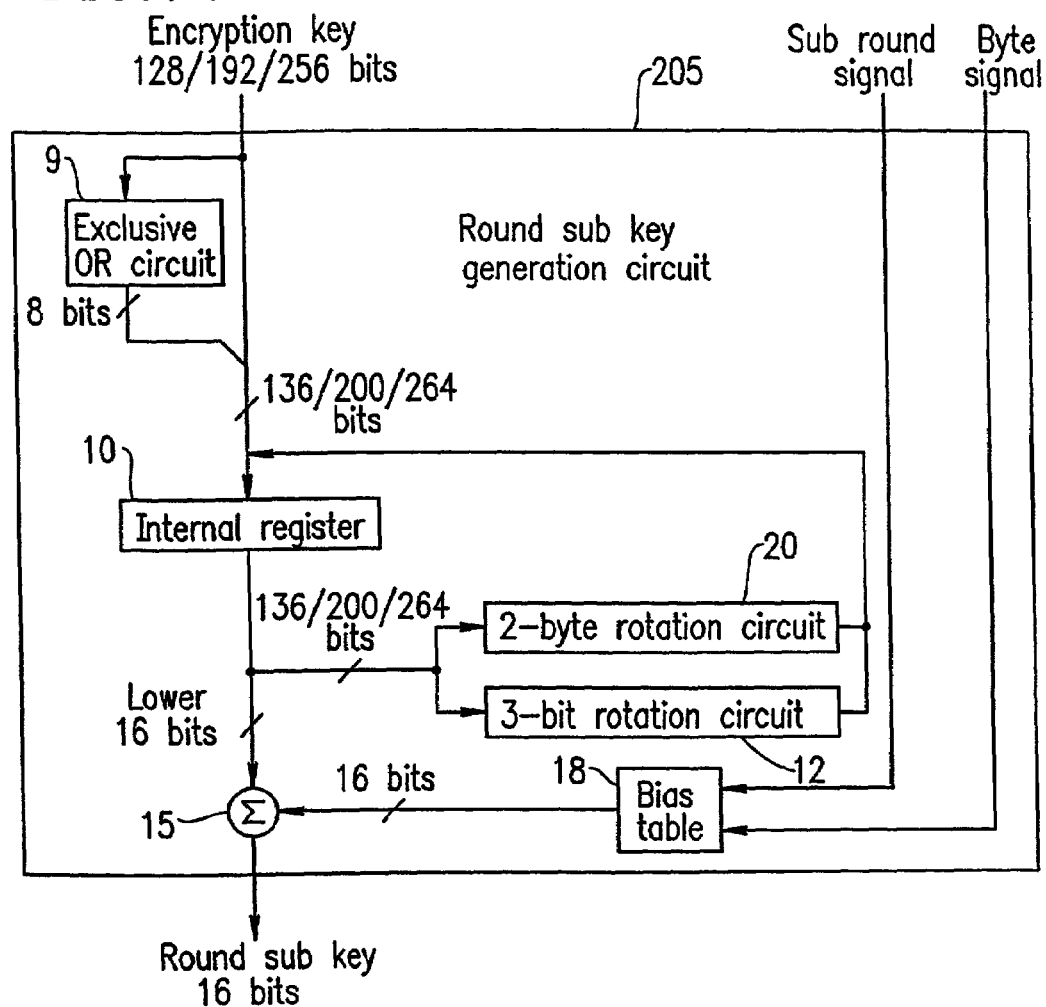
FIG. 14 is a block diagram illustrating a round sub key generation circuit according to a fifth example of the present invention.

FIG. 14 is a block diagram illustrating a round sub key generation circuit 205 as an encryption key generation circuit according to a fifth example of the present invention. The round sub key generation circuit 205 is usable instead of the round sub key generation circuit 2 shown in FIG. 20 and is used for performing the SAFER+1 encryption.

The round sub key generation circuit 205 includes an exclusive OR circuit 9, an internal register 10, a 2-byte rotation circuit 20, a 3-bit rotation circuit 12, a bias table 18, and two adders 15. In FIG. 14, two adders 15 are represented by one adder symbol for the sake of simplicity.

The round sub key generation circuit 205 outputs a round sub key for each sub round, like the round sub key generation circuit 201 in the first example. Whereas the round sub key generation circuit 201 outputs the 128-bit round sub key simultaneously, the round sub key generation circuit 205 outputs the 128-bit round sub key in 16 bits by 16 bits. In addition, a 16-bit bias value is determined by a sub round signal and a byte signal in the bias table 18. A "sub round signal" designates the number of each sub round, and a "byte signal" represents the ordinal number, in the round sub key, of the lowest byte of the internal register 10. Since the bias value which is added at one time is 2 bytes, only two adders 15 are required instead of 16. This further reduces the circuit size.

Figure 15A:
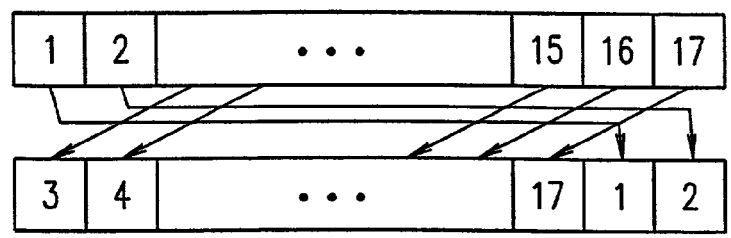
FIGS. 15A and 15B show an operation of a 2-byte rotation circuit in the round sub key generation circuit shown in FIG. 14.

FIG. 15A shows a procedure of performing 2-byte rotation of 17 bytes using the 2-byte rotation circuit 20. In FIG. 15A, each square box represents 1 byte stored in the internal register 10. The numeral in each box represents the ordinal number of the respective byte. More specifically, for example, numeral "1" indicates that information represented by the first byte is stored; numeral "2" indicates that information represented by the second byte is stored; and so on. An upper series of boxes in FIG. 15A represents the state of the internal register 10 before the 2-byte rotation is executed. As shown, the boxes bear sequential numerals from left to right. A lower series of boxes in FIG. 15A represents the state of the internal register 10 after the 2-byte rotation is executed. As shown, information represented by the 17th byte shifts to the 15th box from the left; information represented by the 16th byte shifts to the 14th box from the left; and so on. Information represented by the 3rd byte shifts to the leftmost box; information represented by the 2nd byte shifts to the 17th box from the left; and information represented by the leftmost byte shifts to the 16th box from the left.

Figure 15B:
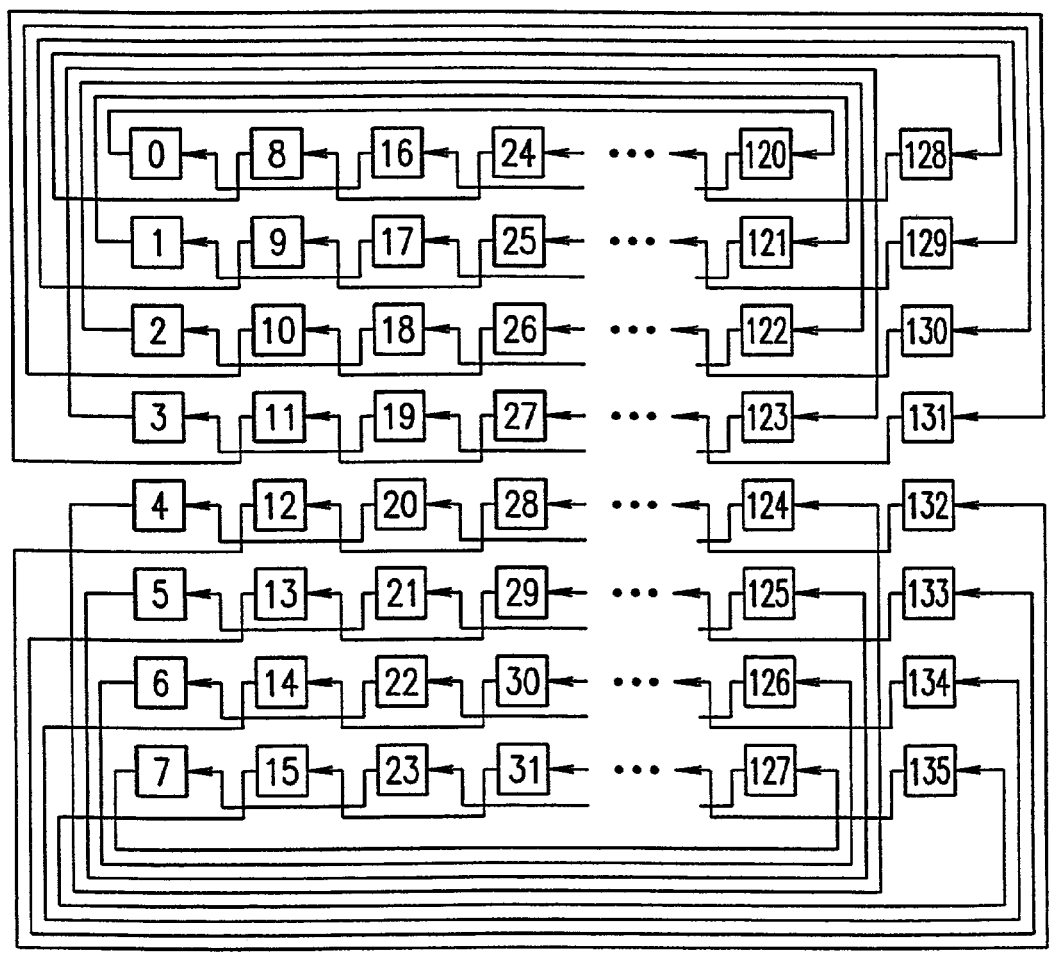

FIG. 15A shows the byte-by-byte state of the internal register 10. FIG. 15B shows a bit-by-bit state of the internal register 10. In FIG. 15B, each square box represents 1 bit stored in the internal register 10. The numeral in each box represents the ordinal number of the respective bit (out of 0th through 135th bits) stored in the internal register 10. More specifically, for example, numeral "0" indicates that information represented by the first bit is stored; numeral "1" indicates that information represented by the second bit is stored; and so on. Eight square boxes of the leftmost column (0th through 7th bits) in FIG. 15B correspond to the leftmost box (1 byte) in FIG. 15A; and eight square boxes of the second-to-the-leftmost column (8th through 15th bits) in FIG. 15B correspond to the box second-to-the-leftmost square box (1 byte) in FIG. 15A. Along lines provided between the bits, 2-byte rotation is performed; for example, information represented by the 8th bit shifts to the 128th bit; information represented by the 0th bit shifts to the 120th bit; and so on.

FIG. 15B only shows the lines in addition to the bits for better understanding of the signal flow. In actuality, the 2-byte rotation circuit 20 includes a selector on each line for selecting information which is to be stored in the internal register 10, i.e., information to be processed by 2-byte rotation or information to be processed by other processing.

The round sub key generation circuit 205 operates, for example, as follows. Although the manner of processing varies in accordance with the number of bits of the input encryption key, the basic operation is similar. Herein, an operation which is performed when a 128-bit encryption key is input will be described with reference to FIGS. 14 and 16.

The round sub key generation circuit 205 in the fifth example eliminates the output selector 14 in the conventional round sub key generation circuit 2 shown in FIG. 24 and includes only two adders 15 instead of 16, so as to reduce the circuit size. Instead, the round sub key generation circuit 205 includes the 2-byte rotation circuit 13 shown in FIG. 14. Whereas the round sub key generation circuit 201 in the first example outputs information represented by 16 bytes in the internal register 10 simultaneously, the round sub key generation circuit 205 outputs only the two lowest bytes in the internal register 10. The 2-byte rotation circuit 13 basically includes a line and a selector.

FIG. 16 illustrates the state of information in the internal register 10 of the round sub key generation circuit 205 along the time axis. In FIG. 16, each square box represents 1 byte stored in the internal register 10. The numeral in each box represents the ordinal number of the respective byte in the encryption key when the encryption key is input. $K_j[i]$ represents the ith byte of the round sub key $K_j$ including 16 bytes (128 bits).

At time $t_1$, the internal register 10 stores the input 128-bit encryption key (16 bytes). At this point, the exclusive OR circuit 9 calculates an exclusive OR of information located at identical positions (i.e., bits) in all the 16 bytes of the input encryption key. The resultant value is defined as representing information for the respective position in the 17th byte. Then, the internal register 10 outputs information represented by the lowest two bytes to the adders 15. At time $t_1$, information represented by the 1st byte and the 2nd byte of the round sub key $K_1$ (i.e., $K_1[1]$ and $K_1[2]$) is output.

Next, at time $t_2$, the 2-byte rotation circuit 20 performs 2-byte rotation. Namely, as shown in FIG. 16, the bytes are rotated leftward by 2 bytes. More specifically, for example, information represented by the lowest byte shifts to the second box from right, and information represented by the second-to-the-lowest byte shifts to the rightmost box. Then, information represented by the lowest two bytes is output to the adders 15. At time $t_2$, information represented by the 3rd byte and the 4th byte of the round sub key $K_1$ (i.e., $K_1[3]$ and $K_1[4]$) is output.

The above-described steps are repeated until time $t_8$. In this manner, information represented the lowest two bytes in the round sub key $K_1$ is output sequentially, until information represented by all the 128 bits is output.

At time $t_9$ and $t_{10}$, only 2-byte rotation is performed in order to adjust information represented by the 1st byte of the next sub round to be at the lowest byte.

At time $t_{11}$, 3-bit rotation is performed in each byte of the internal register 10. Thus, the round sub key generation circuit 205 is ready to output a round sub key $K_2$. Then, information represented by $K_2[1]$ and $K_2[2]$ is output.

Thereafter, 2-byte rotation and 3-bit rotation are performed in a similar manner. Thus, information represented by a desired byte of a desired round sub key among the round sub keys $K_1$ through $K_{17}$ can be obtained without using an output selector.

In order to add a bias value, a 2-byte bias value which is determined by a sub round signal and a byte signal in the bias table 17 needs to be output since 2-byte information is output from the internal register 10 in one step.

In the case where a 192-bit encryption key or a 256-bit encryption key is input, a similar procedure can be performed to obtain information represented by a desired byte of a desired round sub key.

EXAMPLE 6

Figure 17:
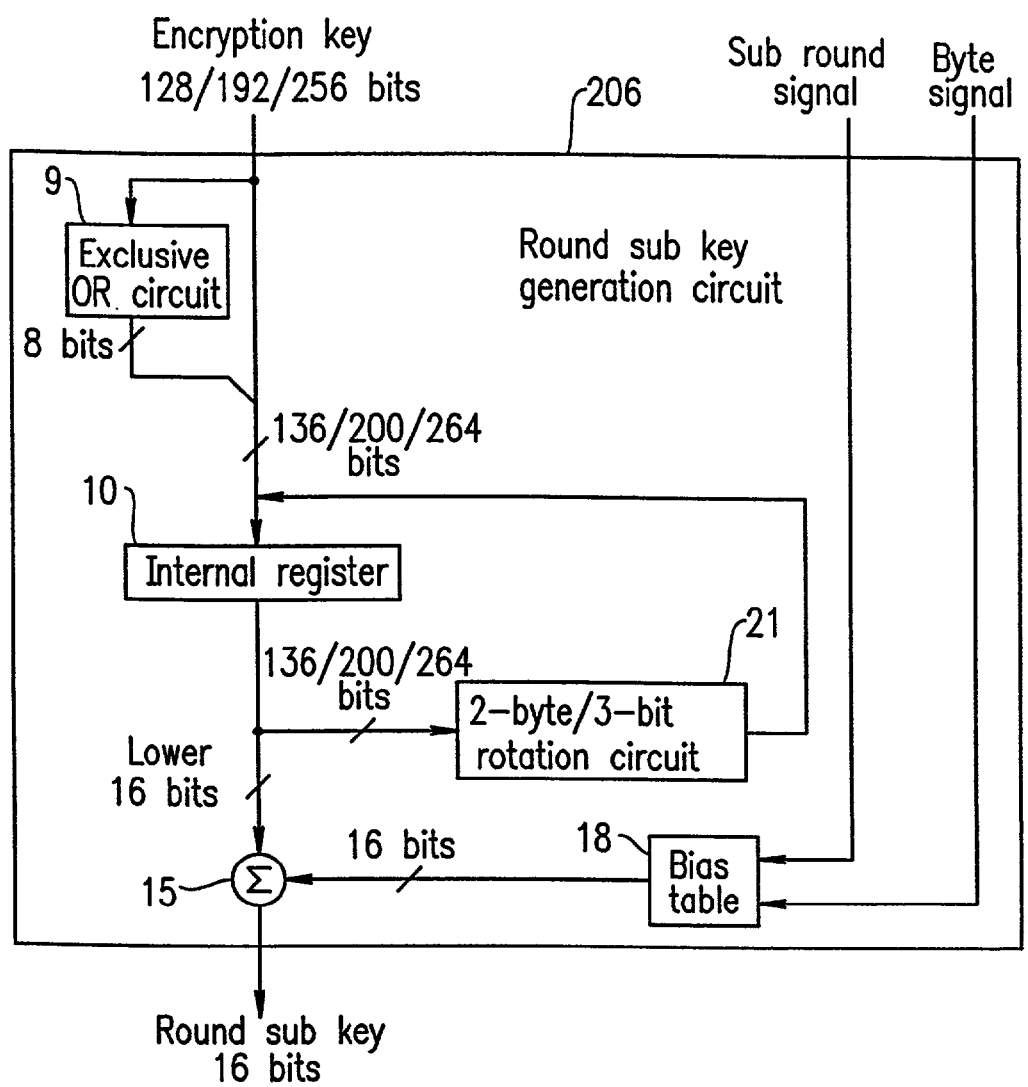
FIG. 17 is a block diagram illustrating a round sub key generation circuit according to a sixth example of the present invention.

FIG. 17 is a block diagram illustrating a round sub key generation circuit 206 as an encryption key generation circuit according to a sixth example of the present invention. The round sub key generation circuit 206 is usable instead of the round sub key generation circuit 2 shown in FIG. 20 and is used for performing the SAFER+1 encryption.

The round sub key generation circuit 206 includes an exclusive OR circuit 9, an internal register 10, a 2-byte/3-bit rotation circuit 21, a bias table 18, and two adders 15. In FIG. 17, two adders 15 are represented by one adder symbol for the sake of simplicity.

The round sub key generation circuit 206 performs 2-byte rotation and 3-bit rotation in the same cycle of processing by the 2-byte/3-bit rotation circuit 21. Therefore, the round sub key generation circuit 206 shortens the processing time and has a reduced size.

Figure 18:
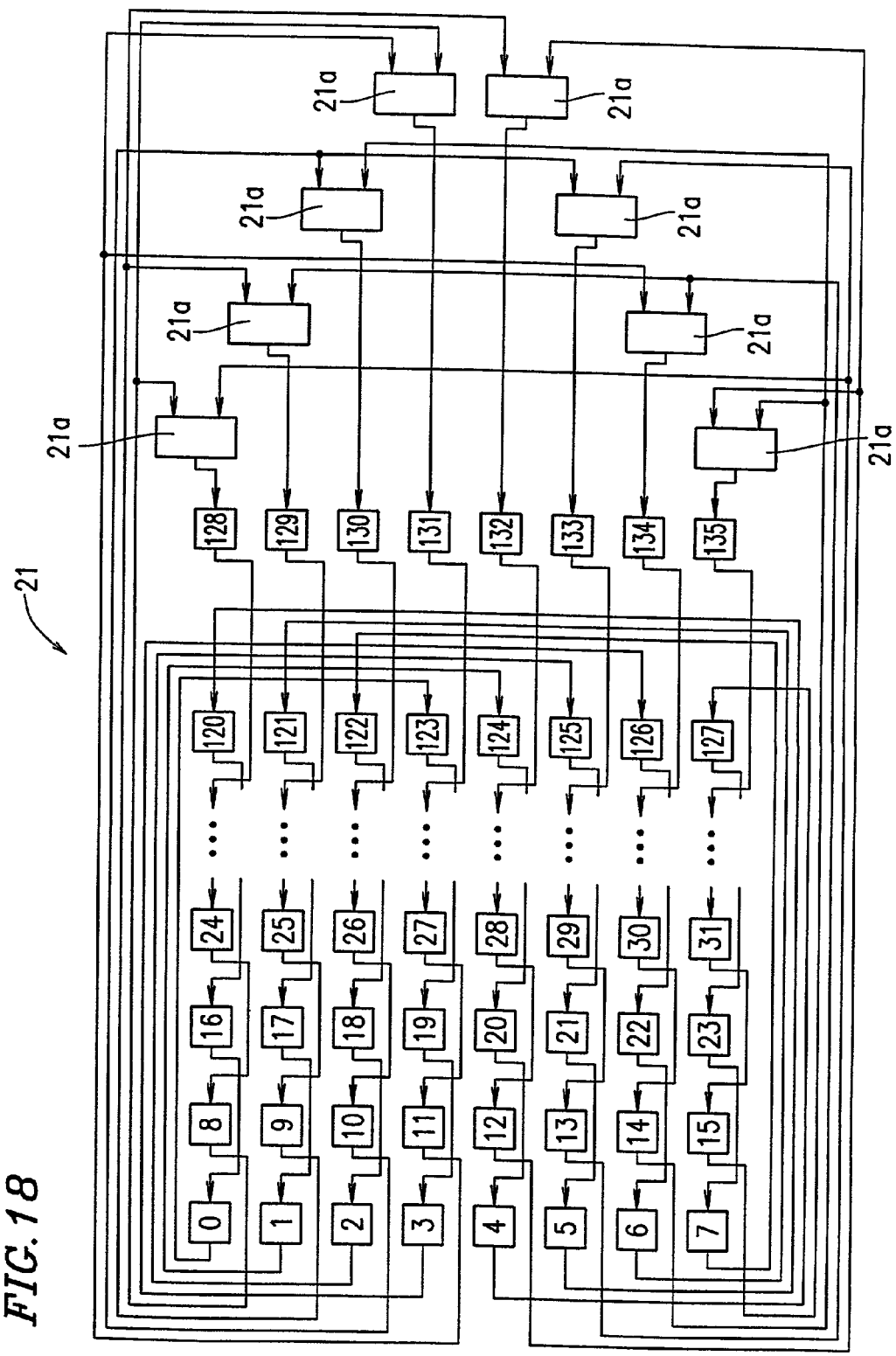
FIG. 18 shows an operation of a 2-byte/3-bit rotation circuit in the round sub key generation circuit shown in FIG. 17.

As shown in FIG. 18, the 2-byte/3-bit rotation circuit 21 performs 3-bit rotation only in the lowest byte, which shifts to the second box from the right, and the second-to-the-lowest byte, which shifts to the rightmost box. Information represented by the (j+1)th byte shifts to the (j−1)th byte. 3-bit rotation is performed only in the 1st byte, which shifts to the second box from the right and in the 2nd byte, which shifts to the rightmost box. The 2-byte/3-bit rotation circuit 21 may shift the information represented by the second-to-the-lowest byte to the highest byte with no 3-bit rotation.

The 2-byte/3-bit rotation circuit 21 includes, in addition to the structure of the byte rotation circuit 20 shown in FIG. 15B, lines and selectors 21a (represented by rectangular boxes in FIG. 18), so that 3-bit rotation is necessarily performed in the lowest byte, which shifts to the second box from the right, and it can be selected whether 3-bit rotation is to be performed or not in the second-to-the-lowest byte, which shifts to the rightmost box. The selectors 21a allow it to be selected whether 3-bit rotation is to be performed in one byte or two bytes.

FIG. 18 only shows the lines and selectors 21a in addition to the bits for better understanding of the signal flow. In actuality, the 2-byte/3-bit rotation circuit 21 includes a selector on each line for selecting information which is to be stored in the internal register 10, i.e., information to be processed by 2-byte/3-bit rotation (or byte rotation) or information to be processed by other processing.

The round sub key generation circuit 206 operates, for example, as follows. Although the manner of processing varies in accordance with the number of bits of the input encryption key, the basic operation is similar. Herein, an operation which is performed when a 128-bit encryption key is input will be described with reference to FIGS. 17 and 19.

The round sub key generation circuit 206 in the sixth example eliminates the output selector 14 in the conventional round sub key generation circuit 2 shown in FIG. 24 and includes only two adders 15 instead of 16, so as to reduce the circuit size. Instead, the round sub key generation circuit 206 includes the 2-byte/3-bit rotation circuit 21 shown in FIG. 17. The round sub key generation circuit 206 outputs only the lowest two bytes in the internal register 10, like the round sub key generation circuit 205.

Figure 19:
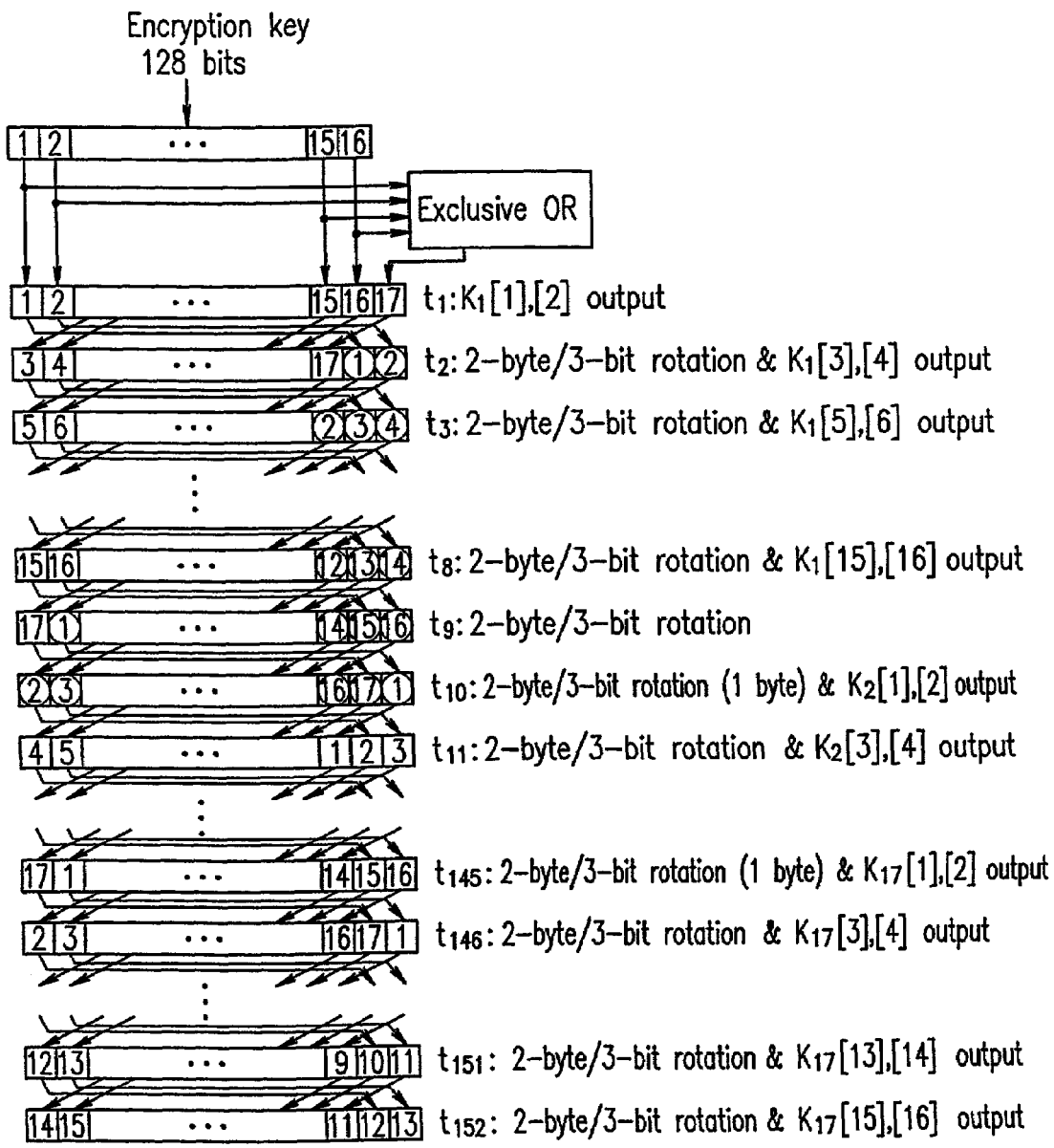
FIG. 19 shows an operation of the round sub key generation circuit shown in FIG. 17.

FIG. 19 illustrates the state of information in the internal register 10 of the round sub key generation circuit 206 along the time axis. In FIG. 19, each square box represents 1 byte stored in the internal register 10. The numeral in each box represents the ordinal number of the respective byte in the encryption key when the encryption key is input. $K_j$ [i] represents the ith byte of the round sub key $K_j$ including 16 bytes (128 bits).

At time $t_1$, the internal register 10 stores the input 128-bit encryption key (16 bytes). At this point, the exclusive OR circuit 9 calculates an exclusive OR of information located at identical positions (i.e., bits) in all the 16 bytes of the input encryption key. The resultant value is defined as representing information for the respective position in the 17th byte. Then, the internal register 10 outputs information represented by the lowest two bytes to the adders 15. At time $t_1$, information represented by the 1st byte and the 2nd byte of the round sub key $K_1$ (i.e., $K_1[1]$ and $K_1[2]$) is output.

Next, at time $t_2$, the 2-byte/3-bit rotation circuit 21 performs 2-byte rotation and 3-bit rotation (only in the lowest byte, which shifts to the second box from the right, and in the second-to-the-lowest byte, which shifts to the rightmost box) concurrently. Information in the other bytes are leftward by 2 bytes. The internal register 10 outputs information represented by the lowest two bytes to the adders 15. At time $t_2$, information represented by the lowest two bytes of the round sub key $K_1$ (i.e., $K_1[3]$ and to $K_1[4]$) is output. In FIG. 19, during the processing of the round sub key $K_1$, the numerals of the rotated bytes in which 3-bit rotation is finished are circled.

The above-described steps are repeated until time $t_8$. In this manner, information represented the lowest two bytes in the round sub key $K_1$ is output sequentially, until information represented by all the 128 bits is output.

At time $t_9$ and $t_{10}$, 2-byte rotation and 3-bit rotation are performed in order to adjust information represented by the 1st byte of the next sub round to be at the lowest byte. It should be noted that at time $t_{10}$, when 3-bit rotation is performed in the second-to-the-lowest byte, which shifts to the rightmost box, the byte bearing numeral "1" is processed with 3-bit rotation at least twice. In order to avoid this, only at time $t_{10}$, 3-bit rotation is performed only in 1 byte, i.e., the lowest byte, which shifts to the second box from the right. When processing up to time $t_{10}$ is finished, the numerals of all the bytes in the internal register 10 are circled. This indicates that 3-bit rotation is performed in all the bytes, and that the round sub key generation circuit 206 is ready to output a round sub key $K_2$. Then, information represented by $K_2[1]$ and $K_2[2]$ is output.

Thereafter, 2-byte rotation and 3-bit rotation are performed in a similar manner. Thus, information represented by a desired byte of a desired round sub key among the round sub keys $K_1$ through $K_{17}$ can be obtained without using an output selector.

The bias table 18 outputs a 2-byte bias value which is determined by a sub round signal and a byte signal.

In the case where a 192-bit encryption key or a 256-bit encryption key is input, a similar procedure can be performed to obtain information represented by a desired byte of a desired round sub key.

In the sixth example, 3-bit rotation is performed simultaneously with the 2-byte rotation. Therefore, the processing time required for outputting one round sub key is shortened by the time required for one step. The processing which requires 169 steps in the fifth example can be performed in 152 steps in the sixth example.

In the first through sixth examples, information represented by the round sub key is output in units of 8 bits, in units of 16 bits, and in a unit of 128 bits. The present invention is not limited to this and is applicable to outputting the information represented by the round sub key in units of other number of bits (8×m, where m is a divider of a byte expression of the number of bits of the encryption key).

As described above, the present invention does not concurrently. Instead, the present invention calculates the round sub keys in units of sub rounds, or calculates one round sub key in units of 1 byte or 2 bytes. In this manner, the number of adders for adding bias values can be reduced. Provision of a circuit for rotating the bytes can eliminate selectors at output stages. Therefore, an encryption key generation circuit for generating a round sub key used in an encryption algorithm SAFER+ can be produced with a sufficiently small scale.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An encryption key generation circuit for generating at least one 128-bit round sub key used in at least one sub round for encryption of 128-bit plaintext, from an encryption key having 64×n bits ($2 \leq n \leq 4$; where n is an integer), comprising:
   an exclusive OR circuit for calculating an exclusive OR of 1-bit information located at identical positions in 8-bit information included in each byte of the encryption key so as to generate 1-byte calculation information;
   a register for storing (8×n+1)-byte information represented by a sum of the encryption key having 8×n bytes and the 1-byte calculation information;
   a byte rotation circuit for performing byte rotation of rotating the (8×n+1)-byte information by 1 byte in each sub round of the at least one sub round;
   a 3-bit rotation circuit for performing 3-bit rotation of rotating bits in each byte of the (8×n+1)-byte information by 3 bits in each sub round; and
   16 adders for adding a 128-bit bias value to (8×n)-byte information from the lowest byte of the (8×n+1)-byte information processed with the byte rotation and the 3-bit rotation, so as to generate one of the at least one 128-bit round sub key in each sub round.

2. An encryption key generation circuit for generating at least one 128-bit round sub key used in at least one sub round for encryption of 128-bit plaintext, from an encryption key having 64×n bits ($2 \leq n \leq 4$; where n is an integer), comprising:
   an exclusive OR circuit for calculating an exclusive OR of 1-bit information located at identical positions in 8-bit information included in each byte of the encryption key so as to generate 1-byte calculation information;
   a register for storing (8×n+1)-byte information represented by a sum of the encryption key having 8×n bytes and the 1-byte calculation information;
   a byte/3-bit rotation circuit for performing byte rotation of rotating the (8×n+1)-byte information by 1 byte and performing 3-bit rotation of rotating bits in each byte of the (8×n+1)-byte information by 3 bits, in each sub round of the at least one sub round; and
   16 adders for adding a 128-bit bias value to (8×n)-byte information from the lowest byte of the (8×n+1)-byte information processed with the byte rotation and the 3-bit rotation, so as to generate one of the at least one 128-bit round sub key in each sub round.

3. An encryption key generation circuit for generating at least one 128-bit round sub key used in at least one sub round for encryption of 128-bit plaintext, from an encryption key having 64×n bits ($2 \leq n \leq 4$; where n is an integer), comprising:
   an exclusive OR circuit for calculating an exclusive OR of 1-bit information located at identical positions in 8-bit information included in each byte of the encryption key so as to generate 1-byte calculation information;
   a register for storing (8×n+1)-byte information represented by a sum of the encryption key having 8×n bytes and the 1-byte calculation information;
   a byte rotation circuit for performing m-byte rotation (where m is a divider of 8×n), at least once, of rotating the (8×n+1)-byte information by m bytes in each sub round of the at least one sub round;
   a 3-bit rotation circuit for performing 3-bit rotation of rotating bits in each byte of the (8×n+1)-byte information by 3 bits in each sub round; and
   m number of adders for adding a (8×m)-bit bias value to each of (8×m)-bit information units in the (8×n)-byte information from the lowest byte of the (8×n+1)-byte information processed with the m-byte rotation and the 3-bit rotation, so as to generate one of the at least one 128-bit round sub key in each sub round.

4. An encryption key generation circuit according to claim 3, wherein m is 1.

5. An encryption key generation circuit according to claim 3, wherein m is 2.

6. An encryption key generation circuit for generating at least one 128-bit round sub key used in at least one sub round for encryption of 128-bit plaintext, from an encryption key having 64×n bits ($2 \leq n \leq 4$; where n is an integer), comprising:
   an exclusive OR circuit for calculating an exclusive OR of 1-bit information located at identical positions in 8-bit information included in each byte of the encryption key so as to generate 1-byte calculation information;
   a register for storing (8×n+1)-byte information represented by a sum of the encryption key having 8×n bytes and the 1-byte calculation information;
   a byte/3-bit rotation. circuit for performing m-byte rotation (where m is a divider of 8×n), at least once, of rotating the (8×n+1)-byte information by m bytes in each sub round of the at least one sub round and performing 3-bit rotation of rotating bits in m byte information in the (8×n+1)-byte information by 3 bits in each m byte rotation; and
   m number of adders for adding a (8×m)-bit bias value to each of (8×m)-bit information units in the (8×n)-byte information from the lowest byte of the (8×n+1)-byte information processed with the m-byte rotation and the 3-bit rotation, so as to generate one of the at least one 128-bit round sub key in each sub round.

7. An encryption key generation circuit according to claim 6, wherein m is 1.

8. An encryption key generation circuit according to claim 6, wherein m is 2.

* * * * *